(12) United States Patent
Mattana

(10) Patent No.: US 9,967,668 B2
(45) Date of Patent: May 8, 2018

(54) BINAURAL RECORDING SYSTEM AND EARPIECE SET

(71) Applicant: Eears LLC, Brooklyn, NY (US)

(72) Inventor: Anthony Mattana, Brooklyn, NY (US)

(73) Assignee: EEARS LLC, Brooklyn, NY (US)

( * ) Notice: Subject to any disclaimer, the term of this patent is extended or adjusted under 35 U.S.C. 154(b) by 0 days. days.

(21) Appl. No.: 15/425,629

(22) Filed: Feb. 6, 2017

(65) Prior Publication Data

US 2017/0150266 A1     May 25, 2017

Related U.S. Application Data

(63) Continuation-in-part of application No. 14/465,057, filed on Aug. 21, 2014.

(51) Int. Cl.
| | |
|---|---|
| *H04R 5/00* | (2006.01) |
| *H04R 5/027* | (2006.01) |
| *G11B 20/10* | (2006.01) |
| *H04S 7/00* | (2006.01) |
| *H04R 1/10* | (2006.01) |

(52) U.S. Cl.
CPC ....... *H04R 5/027* (2013.01); *G11B 20/10527* (2013.01); *G11B 2020/10574* (2013.01); *G11B 2020/10601* (2013.01); *H04R 1/1016* (2013.01); *H04R 1/1041* (2013.01); *H04R 2460/07* (2013.01); *H04S 7/40* (2013.01);
(Continued)

(58) Field of Classification Search
CPC ........ H04S 3/02; H04S 2420/01; H04S 7/307; H04S 7/40; H04S 1/002; H04S 2400/15; H04S 2420/03; H04R 2225/41; H04R 2460/17; H04R 2499/13; H04R 25/656; H04R 3/002; H04R 5/027; H04R 1/1016; H04R 1/1041; H04R 2225/43; H04R 2460/07; H04R 25/552; H04R 29/00; H04M 3/568; H04M 1/6033; H04M 1/605; H04M 1/72572; H04M 3/53366; H04M 9/085; H04M 1/72583; H04M 2201/40; H04M 1/0202; H04M 1/6016; H04M 2250/22
USPC ......................................................... 381/26
See application file for complete search history.

(56) References Cited

U.S. PATENT DOCUMENTS

| | | | |
|---|---|---|---|
| 1,769,907 | A | 7/1930 | De Forest |
| 1,777,037 | A | 9/1930 | De Forest |

(Continued)

OTHER PUBLICATIONS

Search Report for Related International Application PCT/US2015/045810 dated Nov. 9, 2015, 3 pages.

(Continued)

*Primary Examiner* — Lun-See Lao

(74) *Attorney, Agent, or Firm* — Foley & Lardner LLP

(57) ABSTRACT

Systems, methods, and sets for capturing and reproducing a binaural recording are provided. In one embodiment, the binaural recording is captured using an earpiece set that includes a pair of earpieces each including a frame, a microphone, and a transducer. The frame is adapted to be worn on an ear, and defines an ear-insertion end and a posterior end opposite the ear-insertion end. The ear-insertion end is adapted to be positioned within an ear canal. The microphone is coupled to the frame for capturing ambient sound, and adapted to be positioned outside the ear canal and substantially coplanar with a tragus of the ear.

13 Claims, 22 Drawing Sheets

(52) U.S. Cl.
CPC ....... *H04S 2400/15* (2013.01); *H04S 2420/01* (2013.01); *H04S 2420/03* (2013.01)

(56) References Cited

U.S. PATENT DOCUMENTS

| | | | |
|---|---|---|---|
| 2,775,460 | A | 12/1956 | Shivack |
| 4,088,849 | A | 5/1978 | Usami et al. |
| 4,284,847 | A | 8/1981 | Besserman |
| 4,309,570 | A | 1/1982 | Carver |
| 4,658,932 | A | 4/1987 | Billingsley |
| 5,033,086 | A | 7/1991 | Fidi |
| 5,638,343 | A | 6/1997 | Ticknor |
| 5,959,597 | A * | 9/1999 | Yamada ............... G02B 27/017 345/7 |
| 6,687,211 | B2 | 2/2004 | Sawabe et al. |
| 6,859,421 | B2 | 2/2005 | Sawabe et al. |
| 7,591,779 | B2 | 9/2009 | Kalinowski et al. |
| 7,715,568 | B2 | 5/2010 | Nakano |
| 8,019,092 | B2 | 9/2011 | Yuan et al. |
| 8,045,840 | B2 | 10/2011 | Murata et al. |
| 8,175,286 | B2 | 5/2012 | Bech et al. |
| 8,254,591 | B2 * | 8/2012 | Goldstein ............... H04R 25/70 381/313 |
| 8,254,605 | B2 | 8/2012 | Van Schaack et al. |
| 8,340,310 | B2 * | 12/2012 | Ambrose ............... H04R 1/1091 381/328 |
| 9,071,900 | B2 * | 6/2015 | Vesa ........................ H04R 5/04 |
| 2003/0123351 | A1 | 7/2003 | Sawabe et al. |
| 2004/0013271 | A1 | 1/2004 | Moorthy |
| 2004/0190737 | A1 | 9/2004 | Kuhnel et al. |
| 2005/0238176 | A1 | 10/2005 | Nakano |
| 2008/0002948 | A1 | 1/2008 | Murata et al. |
| 2008/0187163 | A1 | 8/2008 | Goldstein et al. |
| 2008/0212788 | A1 | 9/2008 | Bech et al. |
| 2009/0022343 | A1 | 1/2009 | Van Schaack et al. |
| 2009/0028356 | A1 | 1/2009 | Ambrose et al. |
| 2011/0026745 | A1 * | 2/2011 | Said ........................ H04S 1/002 381/310 |
| 2012/0002008 | A1 | 1/2012 | Valin |
| 2012/0237050 | A1 | 9/2012 | Akasaka |
| 2013/0089225 | A1 * | 4/2013 | Tsai ........................ H04R 1/1075 381/309 |
| 2013/0236865 | A1 | 9/2013 | Hamui |
| 2014/0050326 | A1 | 2/2014 | Vesa et al. |
| 2015/0245129 | A1 | 8/2015 | Dusan et al. |

OTHER PUBLICATIONS

Website for www.hookeaudio.com, available as early as Jun. 13, 2014, access on Sep. 2, 2014.
Written Opinion for Related International Application PCT/US2015/045810, dated Nov. 9, 2015, 8 pages.

* cited by examiner

BINAURAL RECORDING SYSTEM AND EARPIECE SET

CROSS-REFERENCE TO RELATED PATENT APPLICATIONS

This is a continuation-in-part of U.S. patent application Ser. No. 14/465,057, filed Aug. 21, 2014, the contents of which are hereby incorporated by reference in their entirety.

BACKGROUND

Mobile audio recording devices typically use a single mono microphone to record sounds or a pair of coincident microphones that are centrally located. For portability, it may be desirable to reduce the size of such mobile audio recording devices. As the size of the mobile audio recording devices is reduced, however, the microphones may not record realistic sounds.

Binaural recording devices can record or capture sound using two microphones that are arranged as if each microphone were a human ear. The so-captured recording can be subsequently played back to reproduce ambient effects to the listener. For example, the binaural recording can produce a three-dimensional impression of sound.

SUMMARY OF THE INVENTION

According to one non-limiting aspect of the present disclosure, an example embodiment of a binaural recording system for recording a sound from an impulsive source is described. The binaural recording system comprises a right earpiece. The right earpiece includes a right frame, the right frame adapted to be worn on a right ear, the right frame defining a right ear-insertion end and a right posterior end opposite the right ear-insertion end, the right ear-insertion end adapted to be positioned within a right ear canal. The right earpiece further includes a right microphone, the right microphone coupled to the right frame and the right microphone adapted to be positioned outside the right ear canal and substantially coplanar with a right tragus of the right ear, wherein the right microphone captures a right side frequency from the impulsive sound source. The right earpiece also includes a right transducer, the right transducer coupled to the right ear-insertion end of the right frame, and the right transducer configured to reproduce a right sound. The binaural recording system further comprises a left earpiece. The left earpiece includes a left frame, the left frame adapted to be worn on a left ear, the left frame defining a left ear-insertion end and a left posterior end opposite the left ear-insertion end, the left ear-insertion end adapted to be positioned within a left ear canal. The left earpiece further includes a left microphone, the left microphone coupled to the left frame and the left microphone adapted to be positioned outside the left ear canal and substantially coplanar with a left tragus of the left ear, wherein the left microphone captures a left side frequency from the impulsive sound source. The left earpiece also includes a left transducer, the left transducer coupled to the left ear-insertion end of the left frame, and the left transducer configured to reproduce a left sound. The binaural recording system further comprises a non-transitory device operatively coupled to the right earpiece and the left earpiece and having instructions thereon that are configured when executed to determine a source localization of the sound from the impulsive source responsive to the right side frequency and the left side frequency. The source localization including an azimuth component and an elevation component, wherein the azimuth component and the elevation component are representative of a three-dimensional impression of the sound, and wherein both the right transducer produces the right sound and left transducer reproduces the left sound responsive to the source localization. The binaural recording system further comprises a wireless transmitter. The wireless transmitter coupled to at least one of the right earpiece and the left earpiece, the wireless transmitter configured to transmit data representative of the source localization and the sound from the impulsive source and receive incoming data representative of the right sound and the left sound. The binaural recording system further comprises a power supply. The power supply is coupled to at least one of the right earpiece and the left earpiece and the power supply coupled to the right microphone, the left microphone, the right transducer, left transducer, and the wireless transmitter.

According to one non-limiting aspect of the present disclosure, an example embodiment of a binaural recording system is described. The example binaural recording system includes a pair of earpieces and a non-transitory device operatively coupled to the ear pieces. Each earpiece includes a frame, a microphone, and a transducer. The frame is adapted to be worn on an ear, and defines an ear-insertion end and a posterior end opposite the ear-insertion end. The ear-insertion end is adapted to be positioned within an ear canal. The microphone is coupled to the frame for capturing ambient sound, and adapted to be positioned outside the ear canal and substantially coplanar with a tragus of the ear. The transducer is coupled to the ear-insertion end of the frame, and configured to reproduce an incoming sound signal. At least one earpiece includes a wireless transmitter coupled to the posterior end of the frame. The wireless transmitter is configured to transmit outgoing data representative of the ambient sound and receive incoming data representative of the incoming sound signal. At least one earpiece includes a power supply electrically coupled to the microphones, the transducers, and the wireless transmitter. The non-transitory device has instructions stored thereon that are configured when executed to selectively operate the microphones and the transducers of the earpieces.

According to another non-limiting aspect of the present disclosure, an example embodiment of an earpiece set is described. The example earpiece set includes a pair of earpieces each including a frame, a microphone, and a transducer. The frame is adapted to be worn on an ear, and defines an ear-insertion end and a posterior end opposite the ear-insertion end. The ear-insertion end is adapted to be positioned within an ear canal. The microphone is coupled to the frame for capturing ambient sound, and adapted to be positioned outside the ear canal and substantially coplanar with a tragus of the ear. The transducer is coupled to the ear-insertion end of the frame, and configured to reproduce an incoming sound signal. At least one earpiece includes a wireless transmitter coupled to the posterior end of the frame. The wireless transmitter is configured to transmit outgoing data representative of the ambient sound and receive incoming data representative of the incoming sound signal. At least one earpiece includes a power supply electrically coupled to the microphones, the transducers, and the wireless transmitter.

According to another non-limiting aspect of the present disclosure, a method for creating a binaural recording is provided. The method includes prompting a user, via a processor, to select a recording option on a touchscreen of a recorder, the recording option selected from the group consisting of recording audio, recording audio and video, broadcasting audio, and broadcasting audio and video. At least one gesture is received from the user on the touchscreen. The selected recording option is determined via the processor. The creation of at least one binaural recording using an earpiece set is caused via the processor. The earpiece set includes a pair of earpieces each including a frame, a microphone, and a transducer. The frame is adapted to be worn on an ear, and defines an ear-insertion end and a posterior end opposite the ear-insertion end. The ear-insertion end is adapted to be positioned within an ear canal. The microphone is coupled to the frame for capturing ambient sound, and adapted to be positioned outside the ear canal and substantially coplanar with a tragus of the ear. The transducer is coupled to the ear-insertion end of the frame, and configured to reproduce an incoming sound signal. At least one earpiece includes a wireless transmitter coupled to the posterior end of the frame. The wireless transmitter is configured to transmit outgoing data representative of the ambient sound and receive incoming data representative of the incoming sound signal. At least one earpiece includes a power supply electrically coupled to the microphones, the transducers, and the wireless transmitter.

According to another non-limiting aspect of the present disclosure, a method for communicating a binaural recording is provided. The method comprises receiving, at a server, a binaural recording created via a binaural recording system comprising a pair of earpieces each including a frame, a microphone, and a transducer, the frame adapted to be worn on an ear, the frame defining an ear-insertion end and a posterior end opposite the ear-insertion end, the ear-insertion end adapted to be positioned within an ear canal, the microphone coupled to the frame for capturing ambient sound, the microphone adapted to be positioned outside the ear canal and substantially coplanar with a tragus of the ear, the transducer coupled to the ear-insertion end of the frame, and the transducer configured to reproduce an incoming sound signal, at least one earpiece including a wireless transmitter coupled to the posterior end of the frame, the wireless transmitter configured to transmit outgoing data representative of the ambient sound and receive incoming data representative of the incoming sound signal, and at least one earpiece including a power supply electrically coupled to the microphones, the transducers, and the wireless transmitter, and a non-transitory device operatively coupled to the earpieces and having instructions thereon that are configured when executed to selectively operate the microphones and the transducers of the earpieces. A user election is received for transmission selected from the group consisting of transmitting the binaural recording to a user device, transmitting the binaural recording via email, and transmitting the binaural recording to a third-party service provider. Responsive to the user election, the binaural recording is transmitted.

According to another non-limiting aspect of the present disclosure, an audio cable is disclosed for connecting a pair of binaural-recording earpieces of the present invention to one or more analog and/or digital audio devices, including but not limited to, cameras, videorecorders, smart phones, audio players and storage devices, and the like. The audio cable of the present disclosure provides for a binaural recording captured from earpieces of the present invention to be received by the one or more analog and/or digital audio devices as an audio input.

Additional features and advantages are described herein, and will be apparent from the following Detailed Description and the figures.

BRIEF DESCRIPTION OF THE DRAWINGS

Features and advantages of the systems and earpiece sets described herein may be better understood by reference to the accompanying drawings in which.

Figure 1:
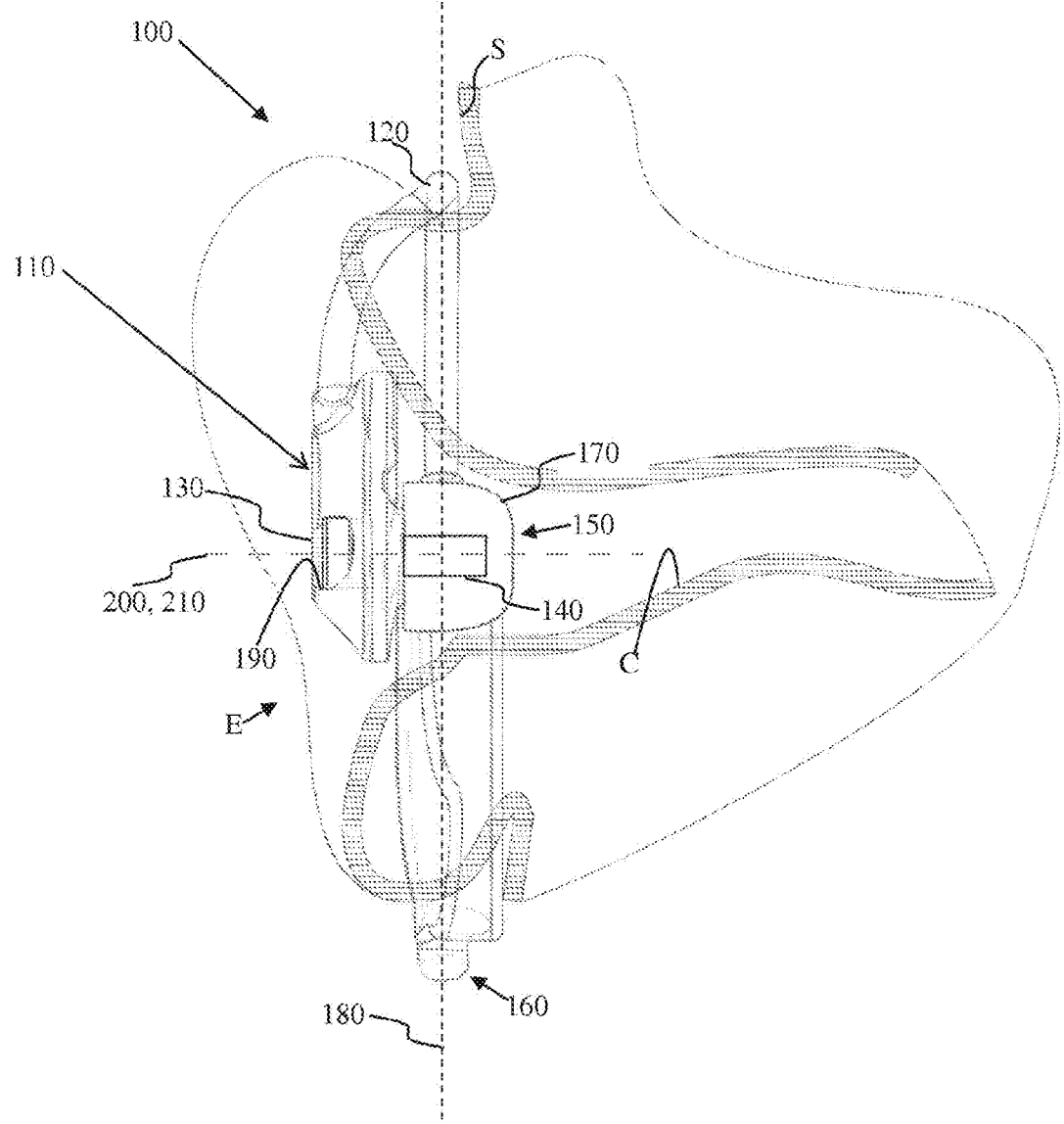
FIG. 1 is a front view of a non-limiting embodiment of an earpiece set according to the present disclosure, illustrating a frame, a microphone, and a transducer in relation to a user's ear.

The reader will appreciate the foregoing details, as well as others, upon considering the following detailed description of certain non-limiting embodiments of systems and earpiece sets according to the present disclosure. The reader may also comprehend certain of such additional details upon using the systems and earpiece sets described herein.

DETAILED DESCRIPTION

Capturing a suitable binaural recording substantially without augmentation or attenuation relative to the ambient sound can be complex and cumbersome. In particular, depending on the position of the earpiece set on a user's ears, the captured recording may introduce distortion relative to the ambient sound. For example, if a binaural recording is captured using microphones positioned within the ear canals of a user, lower frequencies may be undesirably augmented. On the other hand, if a binaural recording is captured using a microphone positioned substantially outside the ear canals of a user, the recording may not sufficiently reproduce ambient effects to the listener. Thus, there has developed a need for systems and earpiece sets for capturing a suitable binaural recording that are made of a simple construction and are user-friendly.

The present disclosure, in part, is directed to systems and earpiece sets for capturing and reproducing a binaural recording. The binaural recording is captured using an earpiece set that includes a pair of earpieces each including a frame, a microphone, and a transducer. The frame is adapted to be worn on an ear, and defines an ear-insertion end and a posterior end opposite the ear-insertion end. The ear-insertion end is adapted to be positioned within an ear canal. The microphone is coupled to the frame for capturing ambient sound, and adapted to be positioned outside the ear canal and substantially coplanar with a tragus of the ear. This positioning of the microphone can facilitate capturing a suitable binaural recording substantially without augmentation or attenuation relative to the ambient sound. For example, the sound that is captured by the so-positioned microphone can be acoustically identical to the ambient sound that would enter the user's ear naturally.

By capturing sound that is acoustically identical to the ambient sound, the quality of the sound recording is enhanced to provide a three-dimensional impression for the listener, as if the listener were present when and where the recording took place. In one non-limiting example, the so-captured recording can provide an impression such that one can travel back in time to relive one's favorite concert again and again. In another non-limiting example, the visceral soundscape of a political protest may be captured vividly enough to present as evidence in a court of law. In yet another non-limiting example, the so-captured recording can provide an impression to a grandparent, who is hundreds of miles away, so as to feel like being right there in the room with the grandchild. In this regard, the systems and earpiece sets according to the present disclosure can be versatile for acoustics in various contexts.

A "binaural recording" as used herein includes definitions that are generally known in the relevant art, and can refer to sound recorded or captured using two microphones that are arranged as if each microphone were a human ear.

An "ear canal" as used herein includes definitions that are generally known in the relevant art, and can refer to the hole where sound enters the ear; the rest of the ear functions as way to collect ambient sound waves from the surroundings.

An "ambient sound" as used herein includes definitions that are generally known in the relevant art, and can refer to the sound generated from a plurality of sources in the environment surrounding a user. For example, if the user is attending a concert, the ambient sound would be the music from the concert taken as a whole. In another example, if the user is at a baseball game, the ambient sound could be the collective sound of thousands of fans cheering when a grand slam is hit.

An "impulsive source" as used herein means an impulse or point source that generates sound waves relating to a particular sound. For example, if the user is at a baseball game in which the ambient sound is the collective roar of thousands of fans, an impulsive source may be the batter's bat striking the baseball, which generates the definitive crack of the bat as an impulsive sound.

Earpiece Set

Referring to FIGS. 1-4, the illustrated earpiece set 100 includes a pair of earpieces 110. For the purposes of the description, the configuration of each earpiece 110 is generally the same, and will be described with reference to the illustrated earpiece 110 with the same effect as to the other earpiece (not shown). In certain non-limiting embodiments, the earpiece 110 can be made of plastic or similar light weight material allowing for comfortable wear by the user over the user's ear. In other embodiments, the earpiece 110 can be made of metal or similar strong material providing for enhanced strength and rigidity of the earpiece 110. In further embodiments, any material known in the art with similar characteristics can be used to produce the earpiece 110.

Figure 2:
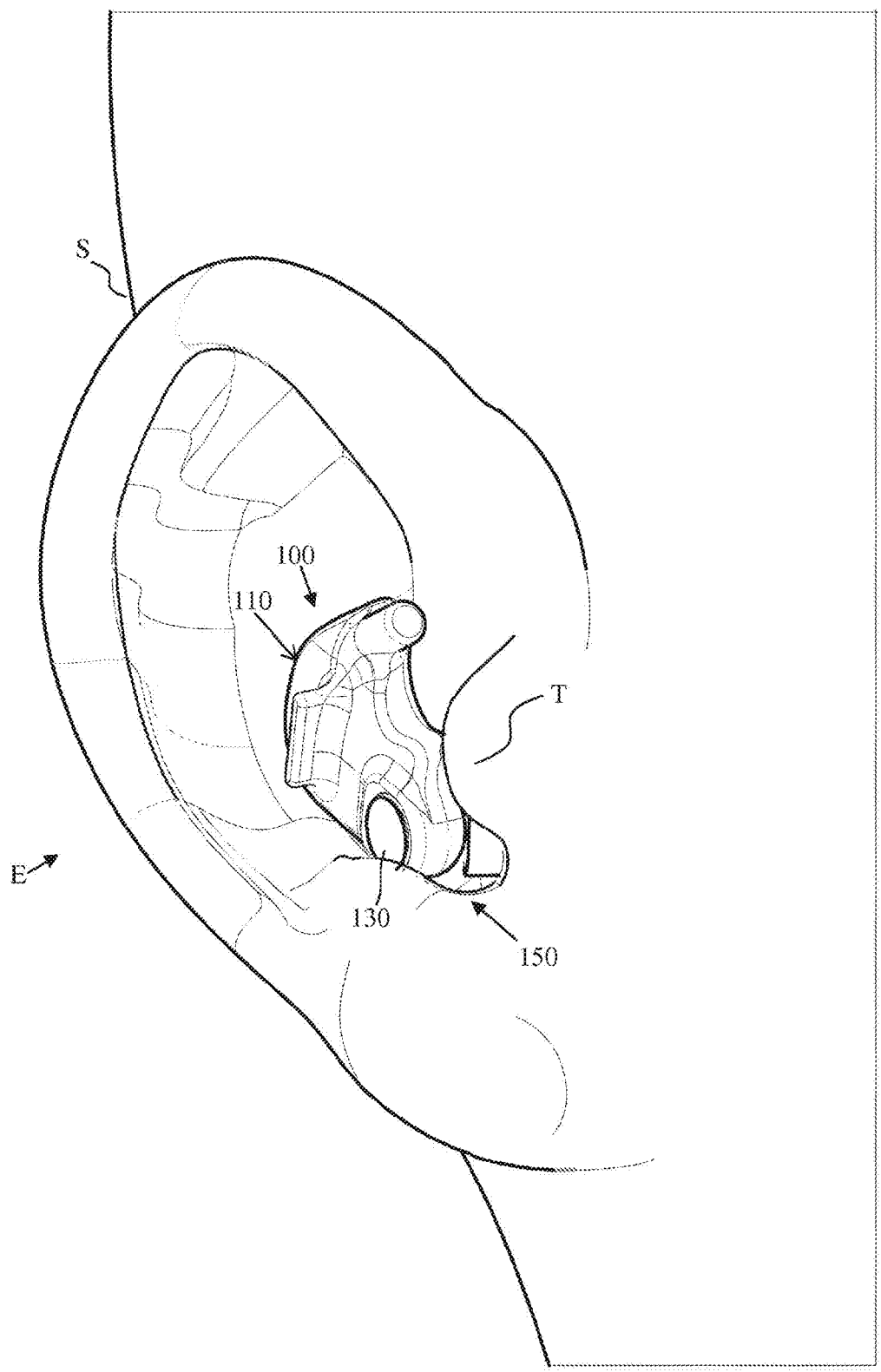
FIG. 2 is a side view of the earpiece set of FIG. 1
Figure 3:
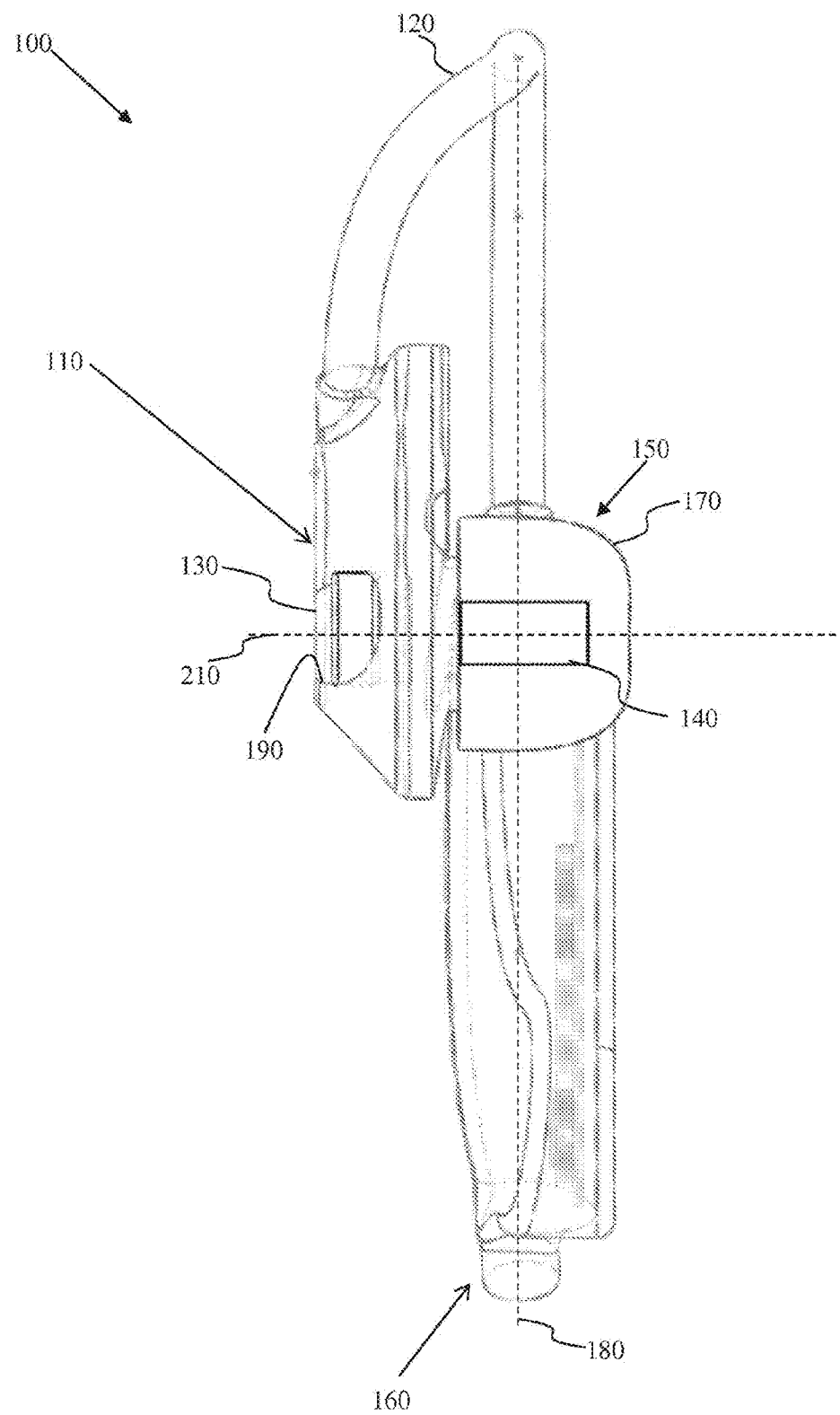
FIG. 3 is an enlarged front view of the earpiece set of FIG. 1.
Figure 4:
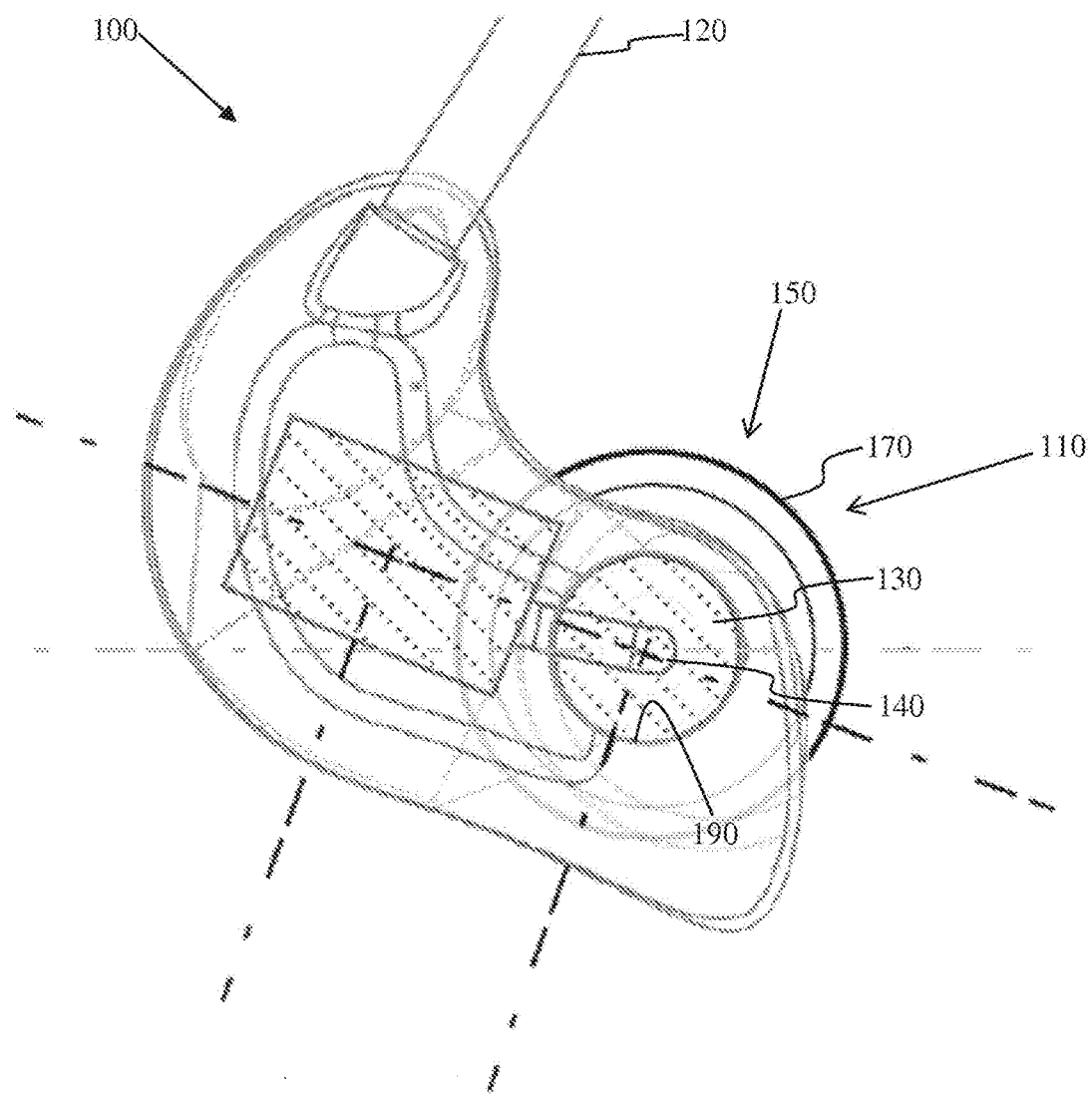
FIG. 4 is an enlarged partial side view of the earpiece set of FIG. 1, illustrating the microphone and the transducer concentrically located relative to each other.

With continuing reference to FIGS. 1-3, the earpiece 110 includes a frame 120, a microphone 130, and a transducer 140. The frame 120 is adapted to be worn on an ear E, and defines an ear-insertion end 150 and a posterior end 160 opposite the ear-insertion end 150. The ear-insertion end 150 is adapted to be positioned within an ear canal C. In certain non-limiting embodiments, the frame 120 of the earpiece 110 can be curved, extending over the top of a user's ear E and resting on the top portion of the user's ear E, between the helix and the skull S. Positioning the frame 120 over the top of the user's ear E between the helix and the skull S can allow the ear insertion end 150 to be located at a suitable location for capturing a binaural recording, as further explained below.

In certain non-limiting embodiments, a pair of deformable bodies 170 can be respectively coupled to the ear-insertion end 150 of the frame 120. The deformable bodies 170 can be adapted to substantially seal the respective ear canal C. For example, sealing of the ear canal can be with respect to sound waves, allowing for optimal playback of recorded sound through the earpieces, as further explained below. In further embodiments, sealing of the ear canal C can seal out water from the ear canal C, thereby protecting the ear canal C and the inner ear from water, for example, when it rains. The deformable bodies 170 can be made of a material allowing for the desired advantage. In other embodiments, the ear insertion end 150 can be made of a hard material, allowing for a more protected encasement of the electronic components located within the ear insertion end 150.

Still referring to FIGS. 1-4, the microphone 130 is coupled to the frame 120 for capturing ambient sound, and adapted to be positioned outside the ear canal C and substantially coplanar with a tragus T of the ear E. The placement of the microphone 130 coplanar with the tragus T can allow the ambient sound that is captured by the microphone 130 to be acoustically identical to the ambient sound that would enter the user's ear E naturally. For example, by capturing this acoustically identical sound, the quality of the sound recording is enhanced to allow subsequent playback of the sound to be the same as if the person subsequently hearing the recorded sound had been present and in the same location as the original recording. The microphone 130 can include any suitable electronic sound capturing devices.

In certain non-limiting embodiments, a respective pair of the transducer 140 and the posterior end 160 of the frame 120 defines a common plane 180, and the microphone 130 is spaced apart from the common plane 180. In other embodiments, the microphone 130 can be located substantially coplanar with the common plane 180, provided the microphone 130 is positioned outside the ear canal C and substantially coplanar with the tragus T of the ear E.

In certain non-limiting embodiments, each microphone 130 is respectively housed in an opening 190 within the frame 120. Depending on the usage requirements or preferences for the particular microphone 130, an opening 190 having a shape that mirrors the shape of the ear canal C, e.g. substantially cylindrical, can provide an acoustical advantage. In certain non-limiting embodiments, each ear canal C respectively defines a first longitudinal axis 200, and each substantially cylindrical opening 190 respectively defines a second longitudinal axis 210 extending substantially parallel to the first longitudinal axis 200. In further embodiments, each microphone 130 respectively covers at least a part of the transducer 140 when viewed along the second longitudinal axis 210. In other embodiments, the opening 190 can be any other shape necessary to fit the microphone within the housing and allowing for the passage of sound waves from the outside environment into the microphone 130. For example, a rectangular opening may provide for easier substitution of different microphones 130.

In certain non-limiting embodiments, the opening 190 can point in substantially the same direction as the ear canal C. In this regard, if a first vector were to point in the direction of the ear canal C, a second vector pointing in the direction of the opening 190 extends parallel to the first vector. Depending on the usage requirements or preferences for the particular microphone 130, the alignment of these two vectors can ensure that the microphone 130 is pointed in the most acoustically accurate direction for capturing ambient sound waves.

In certain non-limiting embodiments, the ambient sound defines amplitudes having frequency characteristics, and the microphones 130 are positioned such that the outgoing data represents frequency response characteristics substantially without augmentation or attenuation relative to the frequency characteristics of the ambient sound from approximately 20 Hz to approximately 20 kHz. However, in other embodiments, other frequency ranges may also be targeted by adjusting the microphone 130.

In certain non-limiting embodiments, each microphone 130 is fixedly coupled to a respective frame 120. By fixedly coupling the microphone 130 to the frame 120, the microphone 130 can stay electrically connected to the rest of the components in a simple construction. In other embodiments, however, the microphone 130 can be removably coupled to the frame 120, allowing for the removal and replacement of the microphone 130.

With continuing reference to FIGS. 1-4, the transducer 140 is coupled to the ear-insertion end 150 of the frame 120, and configured to reproduce an incoming sound signal. In certain non-limiting embodiments, the transducer 140 can be configured to receive electrical signals and transform the signals into sound waves or to receive sound waves and transform the sound waves into electrical signals. When the transducer 140 is configured to receive electrical signals and transform the signals into sound waves, the transducer 140 acts similar to an in-ear speaker, providing sound play-back for the user. That is, the transducer 140 can be used for subsequent play-back of sound that was originally recorded with the microphone 130, as further explained below.

Figure 5:
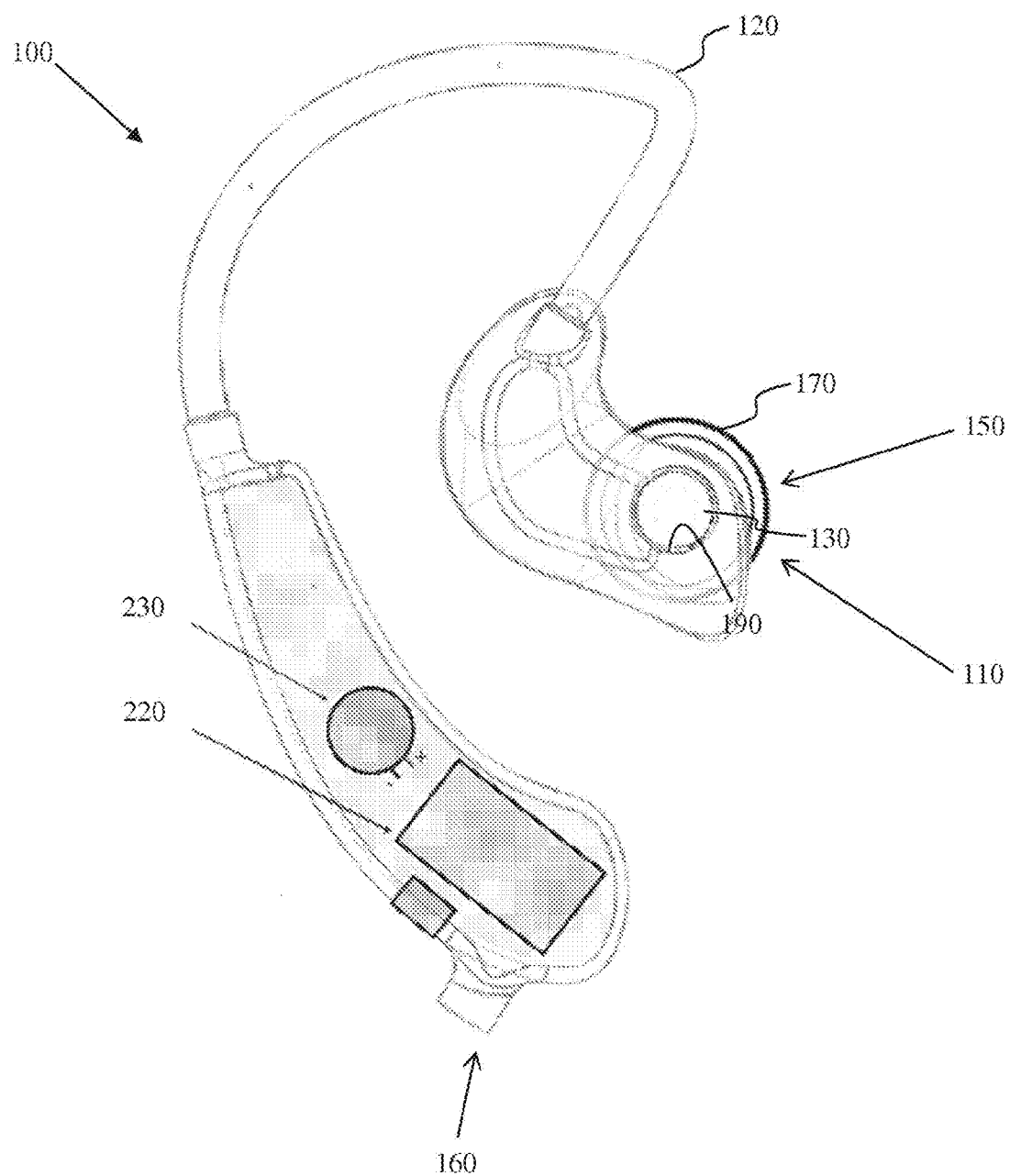
FIG. 5 is a cutaway view of the earpiece set of FIG. 1.

Referring to FIG. 5, in the illustrated embodiment, each earpiece 110 includes a wireless transmitter 220 coupled to the posterior end 160 of the frame 120. In other embodiments, one earpiece 110 may include a wireless transmitter 220 coupled to the posterior end 160 of the frame 120, and the other earpiece may not include the wireless transmitter 220. The wireless transmitter 220 allows for two-way communication. In this regard, the wireless transmitter 220 is configured to transmit outgoing data representative of the ambient sound and receive incoming data representative of the incoming sound signal. For example, the incoming and outgoing data can be sound signals stored for each stereo channel in a Waveform Audio File Format ("WAV"), an AC-3 format, an advanced audio coding ("AAC") format, an MP3 format, or any other audio file. In certain non-limiting embodiments, the outgoing data corresponds directly to the captured sound substantially without any augmentation or attenuation. However, in other embodiments, the outgoing data may be augmented, attenuated or tuned.

In certain non-limiting embodiments, the transmitted data can also be configured to be other signals necessary for the connection and operation of the earpieces 110. For example, other transmitted data could include a wireless charging signal for the earpiece 110, or similar signals. In certain non-limiting embodiments, the wireless transmitter 220 can be configured to comply with existing transmission protocols such as a Bluetooth compatible protocol, IEEE 802.11 or similar short and medium range wireless transmission protocols. In other embodiments, the wireless transmitter 220 may use any other suitable form of short or medium range wireless communication.

With continuing reference to FIG. 5, in the illustrated embodiment, each earpiece 110 includes a power supply 230 electrically coupled to the respective microphone 130, transducer 140, and wireless transmitter 220. In other embodiments, one earpiece 110 may include a power supply 230 electrically coupled to the microphones 130, transducers 140, and wireless transmitters 220, and the other earpiece may not include the power supply 230. In further embodiments, the wireless transmitter 220 and/or the power supply 230 can be positioned away from the earpieces 110, for example at the back of a user's head, and shared between the earpieces 110.

In certain non-limiting embodiments, the power supply 230 can be a battery housed in a respective frame 120. A battery could be advantageous for the small, lightweight and portable aspects associated with a battery. In other embodiments, the power supply 230 may be attached or connected to the earpiece 110 outside a respective frame 120. For example, a cord (not shown) may attach the earpiece 110 to an external power supply 230. An external power supply 230 can be advantageous, as it allows for access to a larger power supply. In other embodiments, any other suitable power supplies known in the art may be used. In certain non-limiting embodiments, the coupling between the power supply 230 and the earpiece 110 is accomplished through wires connecting the components, circuitry or other similar electrical connections. In further embodiments, the posterior end 160 contains a charging location to allow for the recharge of the power supply 230.

Binaural Recording System

Figure 6:
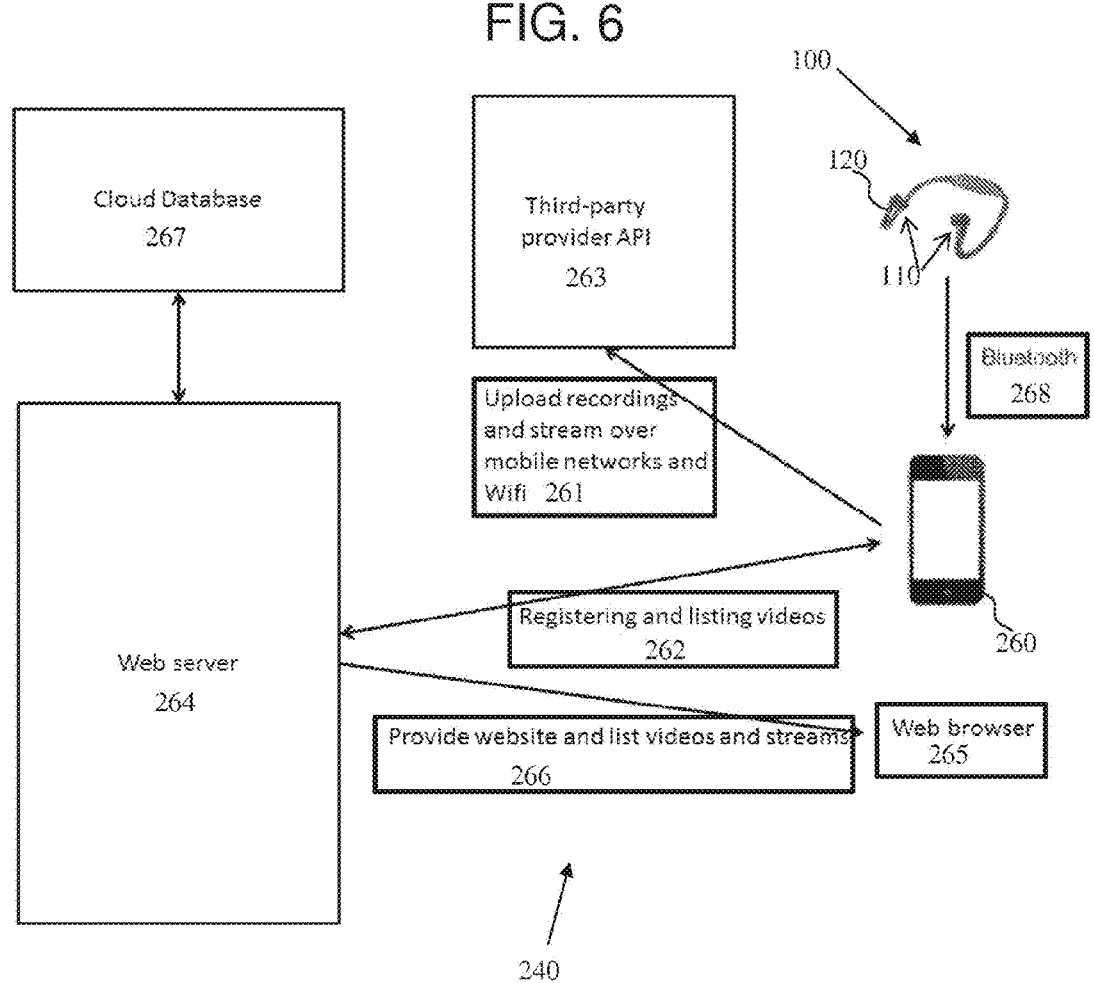
FIG. 6 is a schematic illustration of a non-limiting embodiment of a binaural recording system according to the present disclosure.
Figure 7:
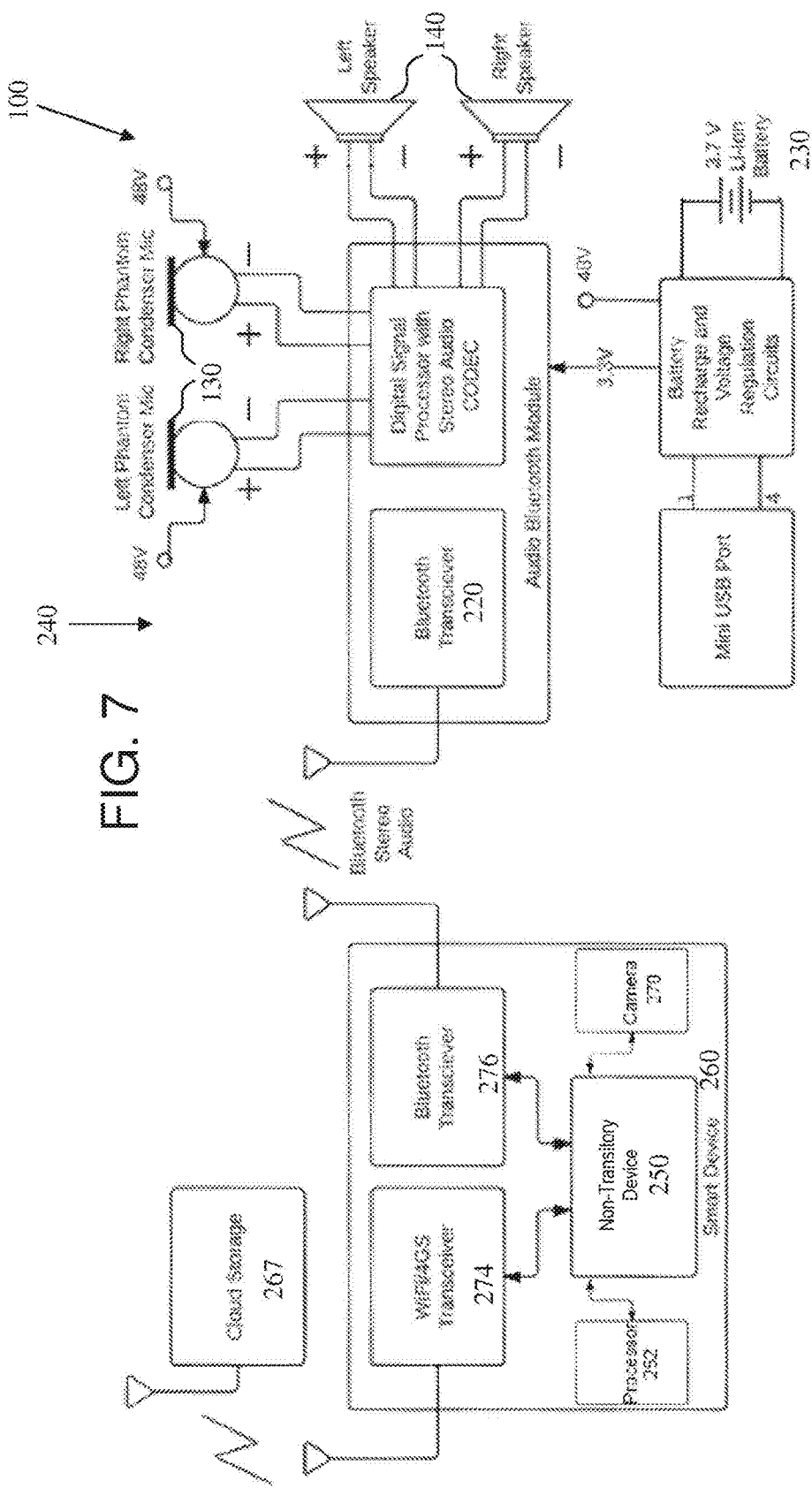
FIG. 7 is an enlarged partial schematic illustration of the binaural recording system of FIG. 6.

FIGS. 6-7 illustrate the binaural recording system 240 according to another embodiment of the invention. The binaural recording system 240 includes a pair of earpieces 110 and a non-transitory device or computing memory 250 operatively coupled to the earpieces 110. The non-transitory device 250 has instructions stored thereon that are configured when executed to selectively operate the microphones 130 and the transducers 140 of the earpieces 110, e.g., allowing for the recording and play back of sound signals. In certain non-limiting embodiments, the non-transitory device 250 has instructions for the earpieces 110 that include start recording commands, stop recording commands, transfer commands, play commands, pause commands, stop commands, volume commands, and other control commands necessary for the operation of the earpiece 110.

In certain non-limiting embodiments, the binaural recording system 240 includes a recorder or receiving device 260 operatively coupled to the earpieces 110 and the non-transitory device 250, and a program stored on the non-transitory device 250, including instructions for recording the ambient sound from each earpiece 110 into a respective audio channel. The recorder 260 can be a smart device such as a smart phone, a smart eyewear, a smart watch, a tablet, a laptop or any other electronic device so long as it has a non-transitory device 250 and a processor 252. A cellular phone can be desirable when a user is interested in the portability of the system. On the other hand, a laptop can be desirable for the enhanced computing power, allowing for analysis and sharing of the electronic signals and larger storage capacity, which in turn can allow for higher quality and greater volume of storage.

In certain non-limiting embodiments, the binaural recording system 240 includes a camera 270 operatively coupled to the non-transitory device 250 in addition to the earpieces 110 for binaural recording. For example, the camera 270 can be any camera containing a 3.5-mm female stereo microphone jack, such as a GoPro® camera or any other suitable digital camera. The earpiece set 100 can include a female 3.5-mm female jack (not shown) that can connect to the camera 270 via a male-to-male 3.5-mm stereo cable (not shown). In another example, the camera 270 can be a three-dimensional stereoscopic imaging apparatus for realistically capturing or recording a video signal. The program stored on the non-transitory device 250 may match the video signal with the audio signal captured by the microphone 130 and allow for the simultaneous playback, or combination of the two signals into one stereo file. In certain non-limiting embodiments, the program includes instructions to determine a command selected from the group consisting of recording only the ambient sound, recording the ambient sound and the video signal, live-streaming only the ambient sound, and live-streaming the ambient sound and the video signal.

In certain non-limiting embodiments, the binaural recording system 240 uses an application programmable interface ("API") to upload and/or stream recordings over mobile networks and Wi-Fi (block 261), and register and list audios and/or videos (block 262). In this regard, the recorder 260 can be used to communicate with a third-party provider API 263 and/or web servers 264 managed by respective entities. In certain non-limiting embodiments, a user can access the web server 264 via a web browser 265, and the web server 264 can provide a searchable web form or web page listing the audios and/or videos and streams (block 266) that are received from the recorder 260. The web server 264 can include a single server, or alternatively, can be distributed among multiple servers and/or within a cloud computing framework 267.

User Interface

Figure 8:
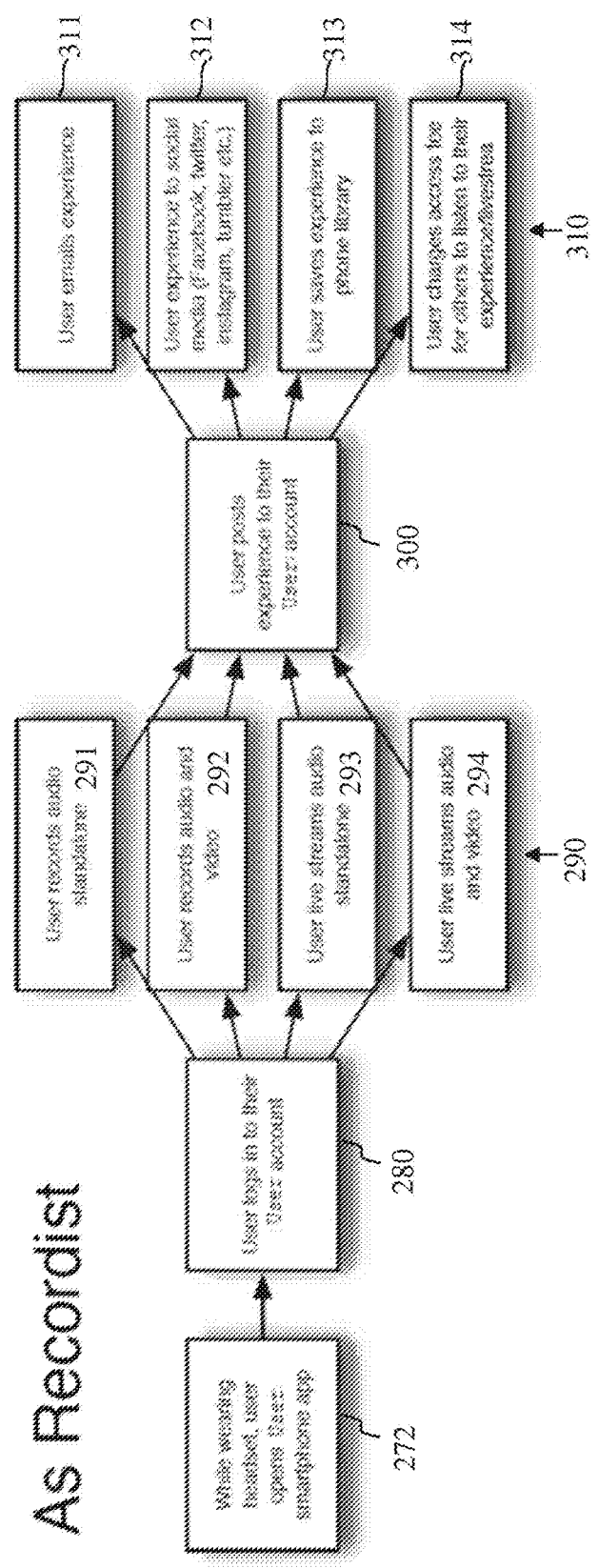
FIG. 8 is a flow chart of a user recording using the binaural recording system of FIG. 6.
Figure 9:
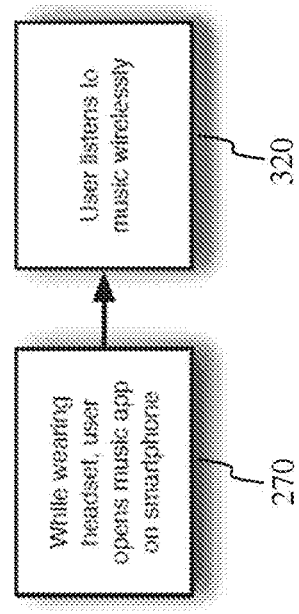
FIG. 9 shows a flow chart of a user listening using the binaural recording system of FIG. 6.

Also referring to FIGS. 8-9, the recorder 260 is configured to select between at least a recording mode and a playback mode, as well as provide for the collection and storage of data corresponding to at least sound recordings. In the recording mode, a user, while wearing at least one earpiece 110, opens an application user interface or program on the recorder 260 (block 272). The user interface can be an application ("App") operating on the recorder 260.

Figure 10:
FIGS. 10-12 show examples of a user interface for the binaural recording system of FIG. 6.

Next, the user logs into a user account (block 280). FIG. 10 includes a screenshot of a non-limiting embodiment of the user interface. It should be appreciated that the user interface may be modified in appearance and/or function based upon the configuration of the binaural recording system 240.

In block 290, for creating a binaural recording, a user is prompted, via the processor 252, to select a recording option on a touchscreen of the recorder 260. The user can select a variety of recording options, including, but not limited to: recording audio with the earpiece 110 microphone 130 (block 291), recording audio with the earpiece 110 microphone 130 and video with the recorder 260 camera (block 292), streaming or broadcasting audio with the earpiece 110 microphone 130 (block 293), and streaming or broadcasting audio with the earpiece 110 microphone 130 and video from the recorder 260 (block 294). At least one gesture is received from the user on the touchscreen. In certain non-limiting embodiments, the gesture can include one or more finger contacts or taps, one or more swipes (from left to right, right to left, upward and/or downward) and/or a rolling of a finger (from right to left, left to right, upward and/or downward). The selected recording option is determined via the processor 252. The creation of at least one binaural recording using the earpiece set 100 is then caused via the processor 252, and the wireless transmitter 220 can transmit electrical signals (see FIG. 6, block 268) from the earpiece 110 to the recorder 260 representative of sound signal.

If the user elects to record, the recording can be saved in the user account (block 300). In certain non-limiting embodiments, after block 300, recordings can be emailed (block 311), shared with social media (block 312), saved in the library on the recorder 260 (block 313), or the user could charge a fee for others to listen to the stream or recordings (block 314). In further embodiments, a user can transmit the recordings to a third-party service provider (e.g., post to a Facebook® wall, pin to Pinterest®, or post to a Twitter, Instagram, or Tumblr account). In still further embodiments, a message server may be configured to parse notifications or alerts to notify or alert users of recordings in the form of instant messages, text messages (e.g., SMS, MMS), or web forum messages. The program can also allow users to upload, via a compatible transmission protocol such as Wi-Fi or 4G that may be included in the recorder 260, their recordings to their cloud storage or a similar networked data storage option.

Figure 11:

As one example, FIG. 11 is a screenshot of a non-limiting embodiment of the user interface 1100 illustrating a location where the recording was captured. In certain non-limiting embodiments, the user interface can also be configured for including a GPS location of the earpiece 110, or including metadata associated with the recorded ambient sound, such as song title, people or artists who made the recorded song, and people tagged as having been present when and where the recording took place.

Figure 12:
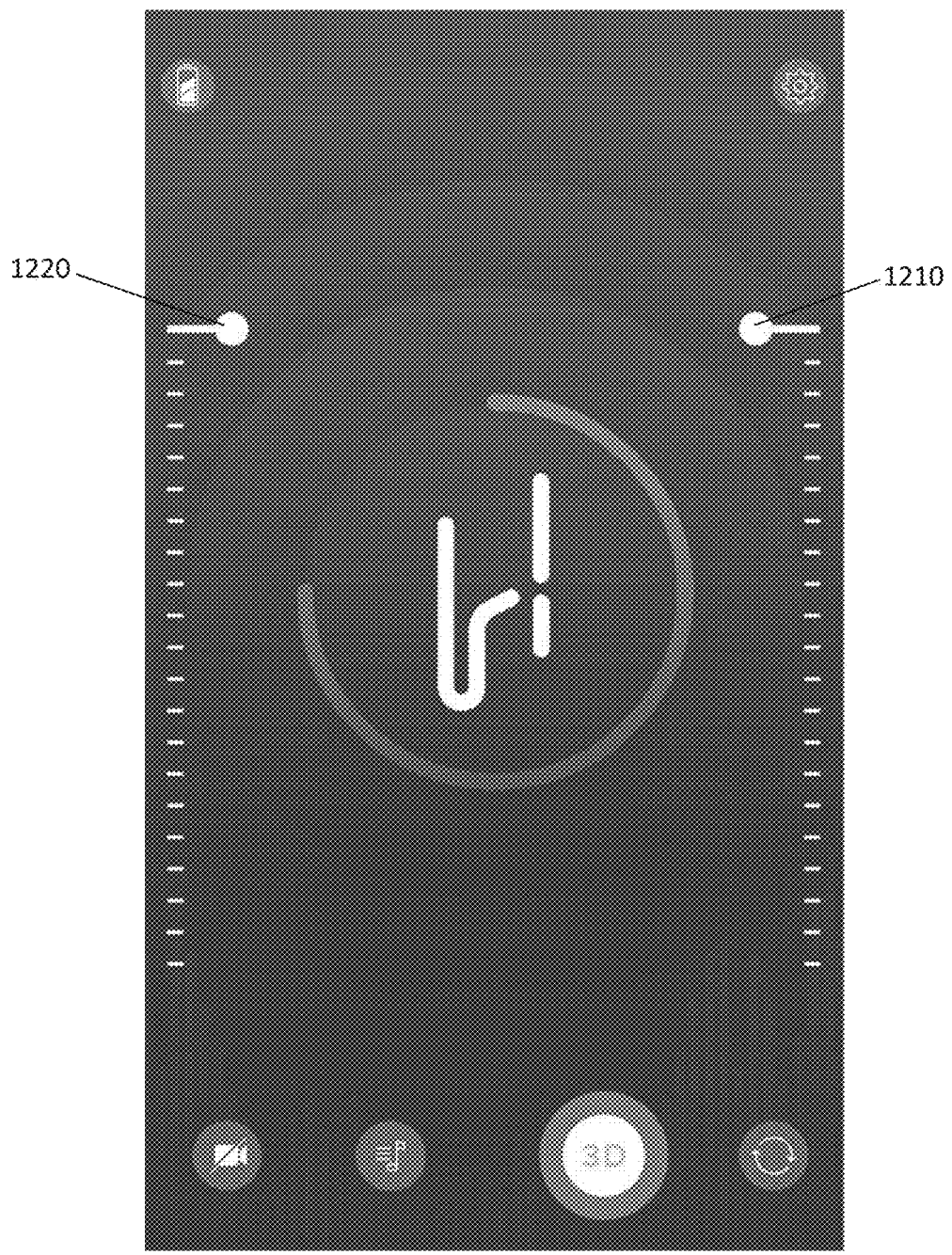

As another example, FIG. 12 is a screenshot of another non-limiting embodiment of the software application or user interface 1100 illustrating user's ability to configure the binaural recording system 100 of the present disclosure. As shown in FIG. 12, the software application may be configured to adjust the microphone level of the left earpiece by adjusting the left mic level 1210 and to adjust the microphone level of the right earpiece by adjusting the right mic level 1220 of the environment in which a user may desire to record ambient and/or impulsive source sound. The left mic level 1210 and the right mic level 1220 also display the sound level captured by each respective microphone. In other words, the left mic level 1210 has a left sound bar (not pictured) corresponding to the sound being captured in the left microphone and the right mic level 1220 has a right sound bar (not pictured) corresponding to the sound being captured in the right microphone. For example, if the binaural recording system 100 were active in a location with a concentration of impulsive source and ambient sound on the left side of the user, the sound level of the left mic level 1210 would be higher than that shown on the right mic level 1220. In some embodiments, the sound level captured is indicated by a different colored and pulsating bar distinct from the color of the entire left 1210 and right 1220 mic level indicator. For example, the left 1210 and right 1220 mic level indicator may be a white bar, and the sound level captured at a given point in time may be a red bar.

In use, the user may place his or her finger on the screen and slide either the left mic level 1210 or the right mic level 1220 to make the recordings louder (e.g., as the microphone recording level is closer to the actual sound being captured by the microphone). In these applications, a user may enhance the ambient sounds and impulsive source during recording or, in other words, the user may adjust a user-programmable gain. As will be appreciated, if the sound level passes the current level for the corresponding left 1210 or right 1220 mic level, the recordings may sound distorted. Additionally, the user may use the built in sound features of the mobile device (e.g., native volume buttons on the phone) to adjust how much a user hears in the earpieces and the adjustment will have no effect on the final recording.

If the user elects to stream, the recording can be streamed using the user account. When a streaming command is issued, the program can connect to or activate a data network via a Wi-Fi or 4G transceiver 274 or Bluetooth transceiver 276 that may be included in the recorder 260, allowing for real-time, or substantially real-time, transmission of the live recording to anyone accessing the network with a compatible program on their own device. The program can stream either video, sound or a combination of both video and sound.

Referring to FIG. 9, to utilize the play-back capabilities, the user, while wearing at least one earpiece 110, opens the program on the recorder 260 (block 272). The user then selects the music file or program to be played, and the recorder 260 sends a wireless signal to the earpiece 110. The wireless transmitter 220 of the earpiece 110 can receive signals corresponding to musical play-back from the recorder 260. The transducer 140 can be used to transform an electric signal into a sound wave for play-back of the sound signal being transmitted. The user can then listen to the file or program through the earpiece 110 (block 320).

Source Localization of Impulsive Sound

Sound from an impulsive source emanates in sound waves that strike human eardrums in such a way that one hearing the sound can determine the direction of the impulsive source and generally the distance to the impulsive source. That is because sound traveling from an impulsive source has a certain characteristics that provide cues as to the location of the source. One cue is the sound pressure level ("SPL"), which diminishes over distance as the sound emanates from the impulsive source. Another cue is the azimuth and elevation of the impulsive source with respect to the individual listener. Together, these cues define a vector that the human ear uses to determine where the impulsive source generating a particular sound is located.

The earpiece 110 of the present invention attempts to capture the three-dimensional characteristics of sound emanating from an impulsive source in much the same way as how the human eardrum works. In particular, the microphone 130 of the earpiece 110 is configured to capture the sound pressure level of the sound emanating from the impulsive source, which the transducer 140 uses to replicate the impulsive sound. The non-transitory device 250 receives data or signals captured by the earpiece 110, which input is referred to as the Head-Related Impulse Response ("HRIR"), and the processor 252 performs certain processing using a Fourier transform of the HRIR to generate a Head-Related Transfer Function ("HRTF"), which contains all of the characteristics of the impulsive source sound, as described below. Once the non-transitory device 250 has HRTF input from each of the left and right earpieces 110, the non-transitory device 250 can determine the source localization of the incoming sound from the impulsive source, which provides for the accurate synthesis of binaural sound from the impulsive source.

The Head-Related Impulse Response ("HRIR") is comprised of the sound pressure level ("SPL") and two directional components, the azimuth and the elevation. The azimuth is the direction to the impulsive source in the horizontal plane (or x-axis), and the elevation is the direction to the impulsive source in the median plane (or y-axis). The following example illustrates how the components of the HRIR are used to determine the source localization of impulsive source sound and thereby synthesize the binaural sound that is recorded by the present invention.

Consider a user who is wearing a left and right earpiece 110 of the present invention and encounters a sound from an impulsive source located to the right of the user. With respect to FIG. 13, which shows a graphical representation of a horizontal plane of the HRIR resulting from the impulsive source sound, the strength of the response, represented by brightness, is strongest and arrives soonest when the impulsive sound is emanating from the user's right side (azimuth=90 Å). Similarly, the response of the impulsive sound is weakest and arrives latest when it is coming from the user's left side (azimuth=270 Å).

Figure 14:
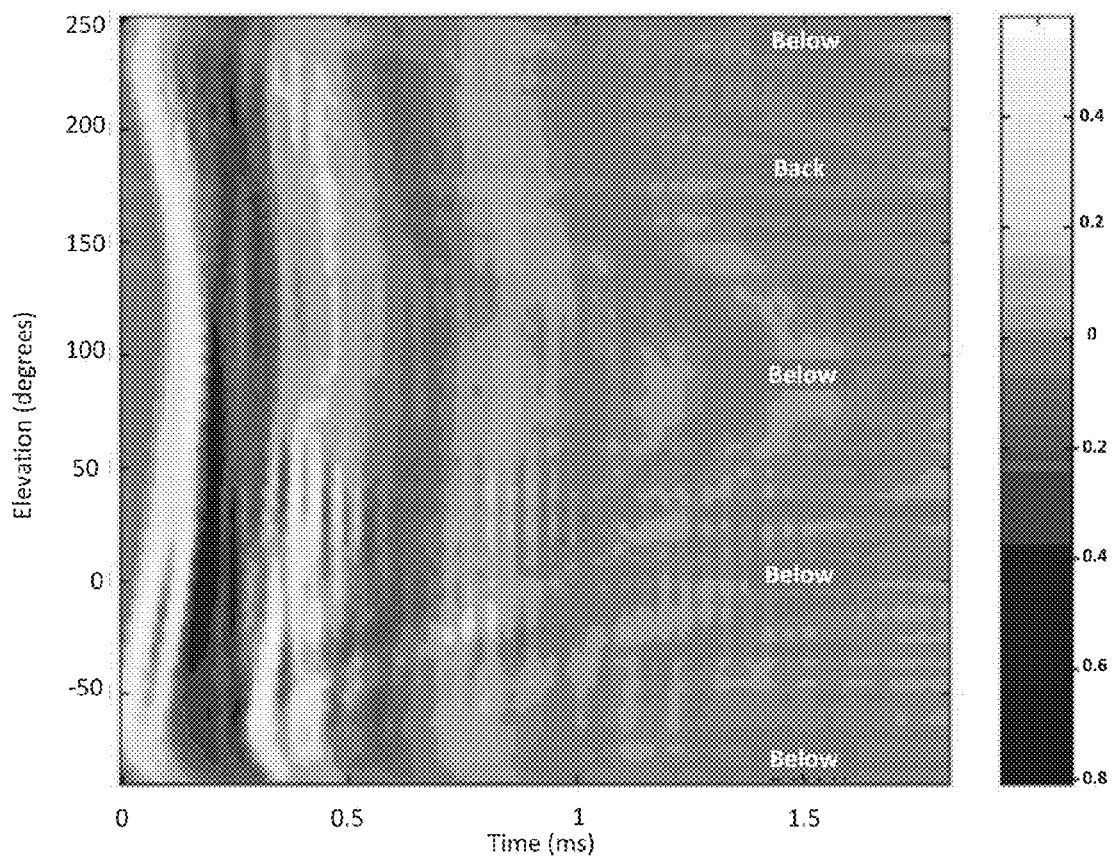
FIG. 14 shows a graphical representation of the impulse response of a right earpiece of the present invention as the impulsive source moves in a median plane with respect to the user.

With respect to FIG. 14, which shows a graphical representation of a median plan of the HRIR resulting from the impulsive source sound, the response varies less with changes in elevation. Arrival time to either of the earpieces 110 is more or less the same. The primary changes in the response are in the relative arrival times and strengths of the pinna reflections, which show up in the frequency domain (see FIG. 17) as a notch whose frequency changes with elevation. The changes in response between front and back with respect to the user is visible in FIG. 14 about a horizontal line at 90 elevation, in which there is a mild symmetry moving from the user towards the front or the user towards the back, with respect to the impulsive source.

Figure 13:
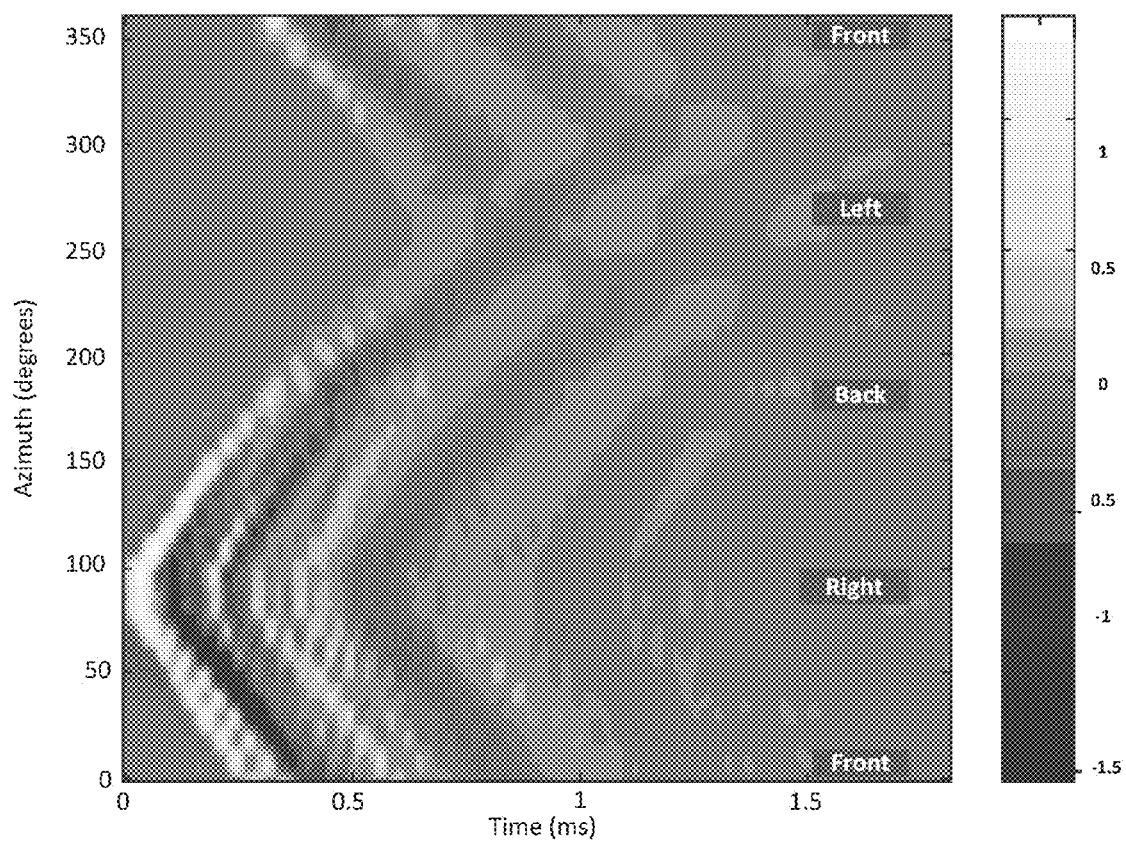
FIG. 13 shows a graphical representation of the impulse response of a right earpiece of the present invention as the impulsive source moves in a horizontal plane with respect to the user.
Figure 15:
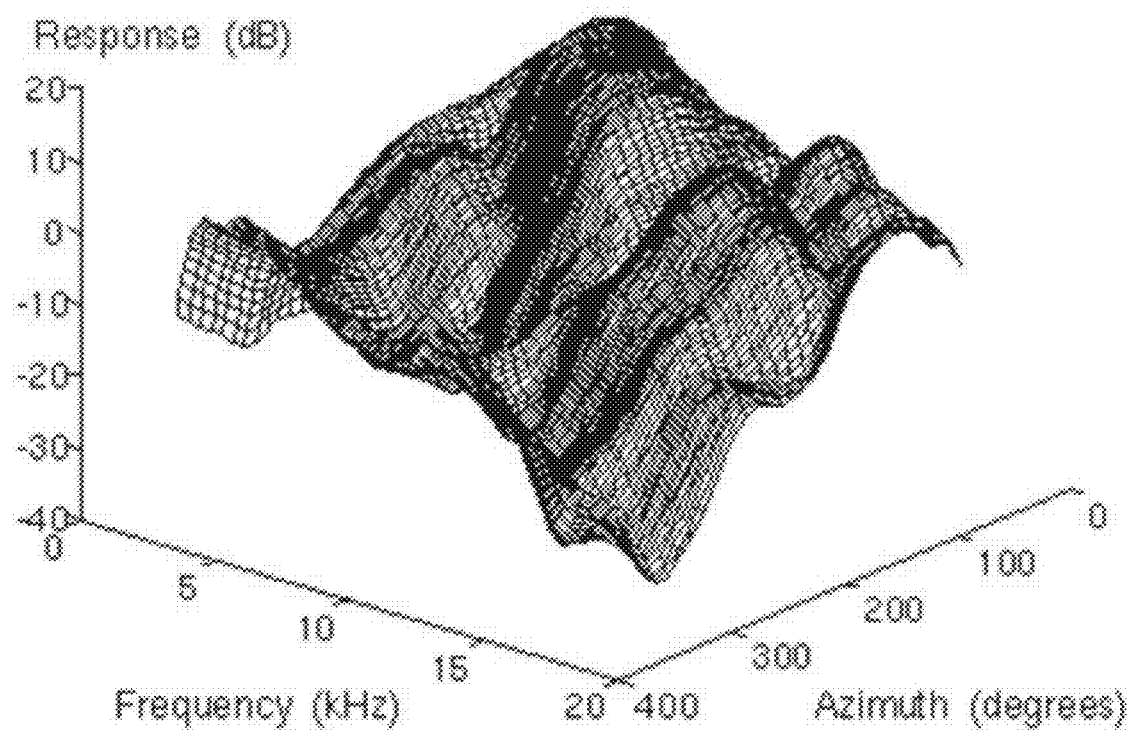
FIG. 15 shows a mesh plot of the frequency response of a right earpiece of the present invention as the impulsive source moves in a horizontal plane with respect to the user.
Figure 16:
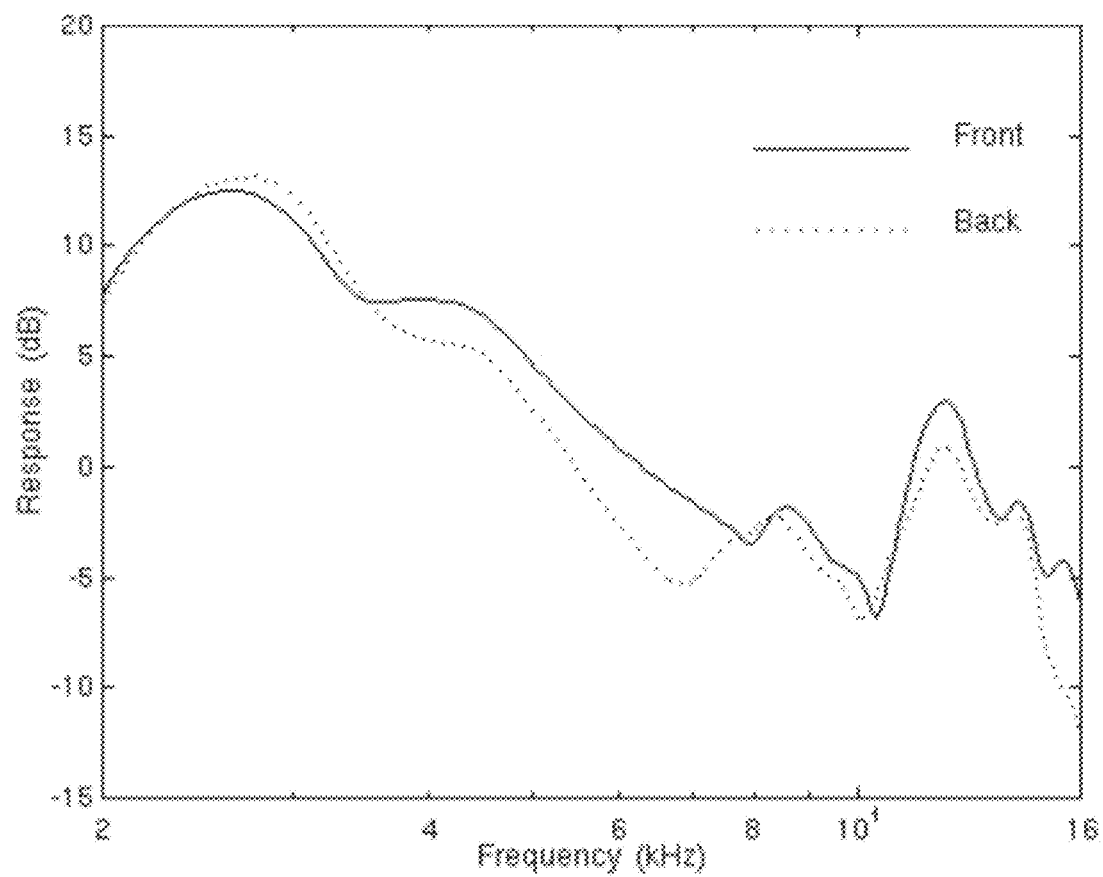
FIG. 16 shows a line graph of the frequency response of a right earpiece of the present invention as the impulsive source moves front to back in a horizontal plane with respect to the user.

From the input data displayed in FIGS. 13-14, the non-transitory device 250 is configured to process, using processor 252, a Fourier Transform to generate the Head-Relating Transform Function, to accurately synthesize the sound emanating from the impulsive source. In particular, with respect to FIG. 15, which is a mesh plot illustrating the frequency response for the right earpiece 110 as the impulsive source moves in the horizontal plane. With respect to any particular frequency, there is a sinusoidal or near-sinusoidal change in the response with changes in azimuth. The response is usually greatest when the impulsive source is at an azimuth of 90 Å and directed into the right ear, and weakest when the source is at an azimuth of 270 Å on the opposite side of the head. FIG. 16 shows the frequency response as it varies from front to back in the horizontal plane. Consistent with FIG. 14, there is only small variances between the response with respect to front and back.

Figure 17:
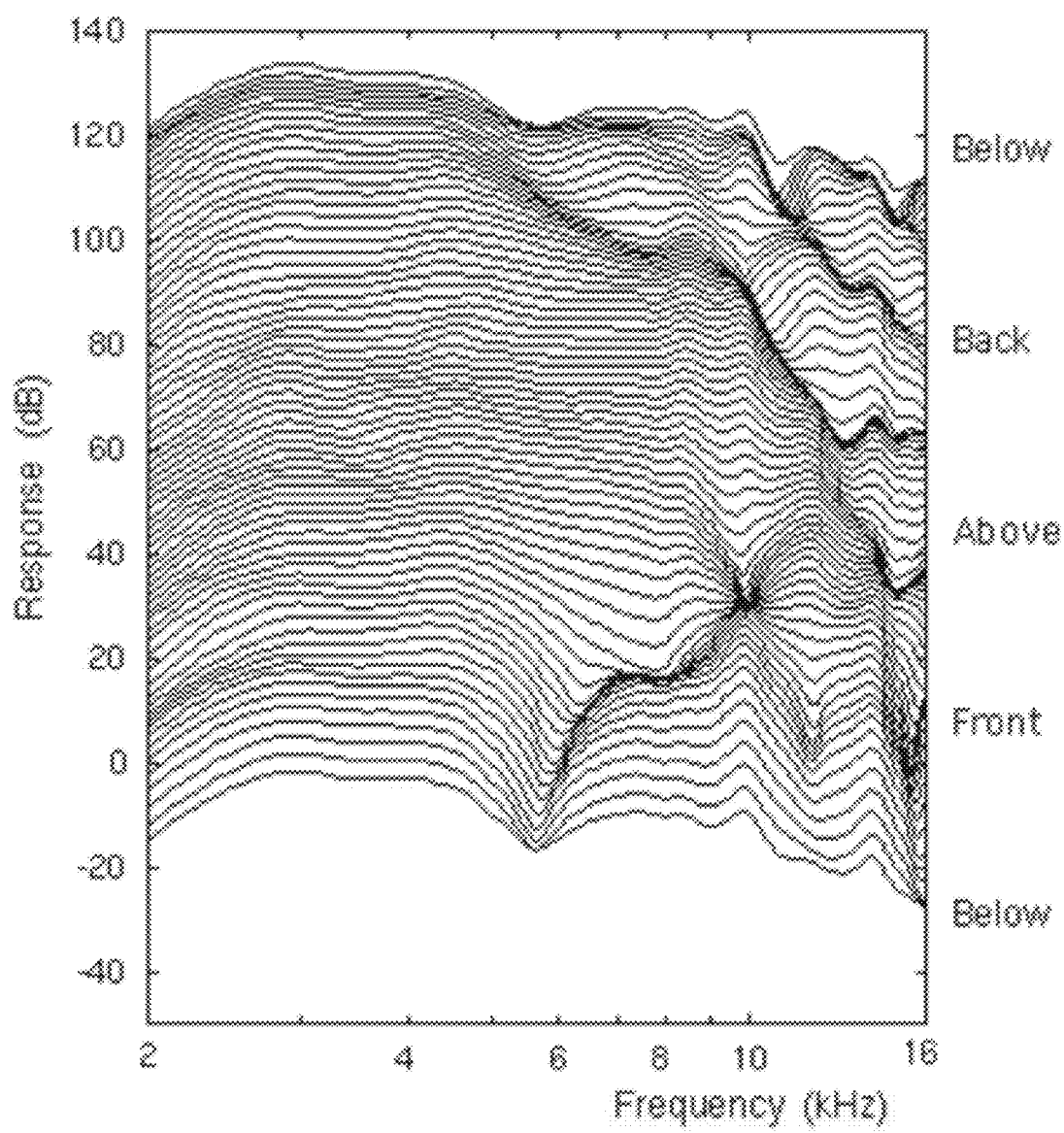
FIG. 17 shows a mesh plot of the frequency response of a right earpiece of the present invention as the impulsive source moves in a median plane with respect to the user.

FIG. 17 demonstrates how the frequency response varies as the impulsive source moves around the user in a median plane. When the impulsive sound has a frequency of about 4 kHz, the broad ear canal resonance changes very little with changes of the source in the median plane. A phenomenon known as the pinna reflection occurs in frequencies ranging between about 6-10 kHz as the impulsive source moves from below to above the user (or as the source moves above to below the user). In FIG. 17, the pinna reflection appears as a notch starting just below 6 kHz at low elevations and up to about 10 kHz as the source moves overhead. When the sources is directly above, the notch stops as the frequency response becomes flat. The notch reappears as the source moves around the back of the user's head and back towards the floor.

Audio Cable

Figure 18:
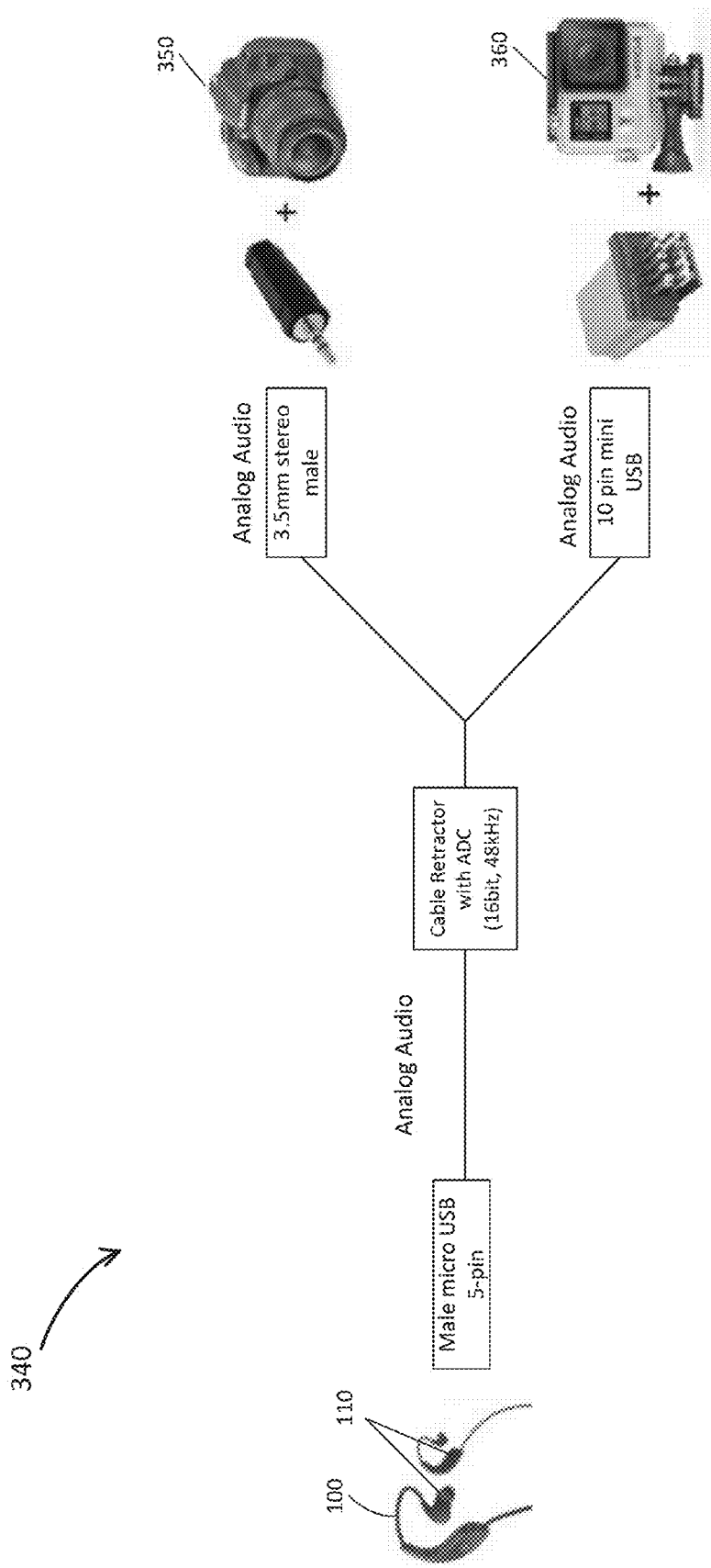
FIG. 18 shows an illustration of how earpieces of the present disclosure may be configured to connect with one or more analog and/or digital audio devices via a cable of the present invention.

The earpieces 110 of the present invention may be configured to provide binaurally-recorded sound as an audio input to one or more analog and/or digital audio devices, such as a camera, a videorecorder such as a GoPro device, or an audio player or storage device. As shown in FIG. 18, an audio cable 340 is disclosed for connecting a pair of binaural-recording earpieces 110 of the present invention to one or more analog 350 and/or digital audio 360 devices, including but not limited to, cameras, videorecorders, smart phones, audio players and storage devices, and the like. The audio cable 340 of the present disclosure provides for a binaural recording captured from earpieces 110 of the present invention to be received by the one or more analog 350 and/or digital audio 360 devices as an audio input.

Figure 19A:
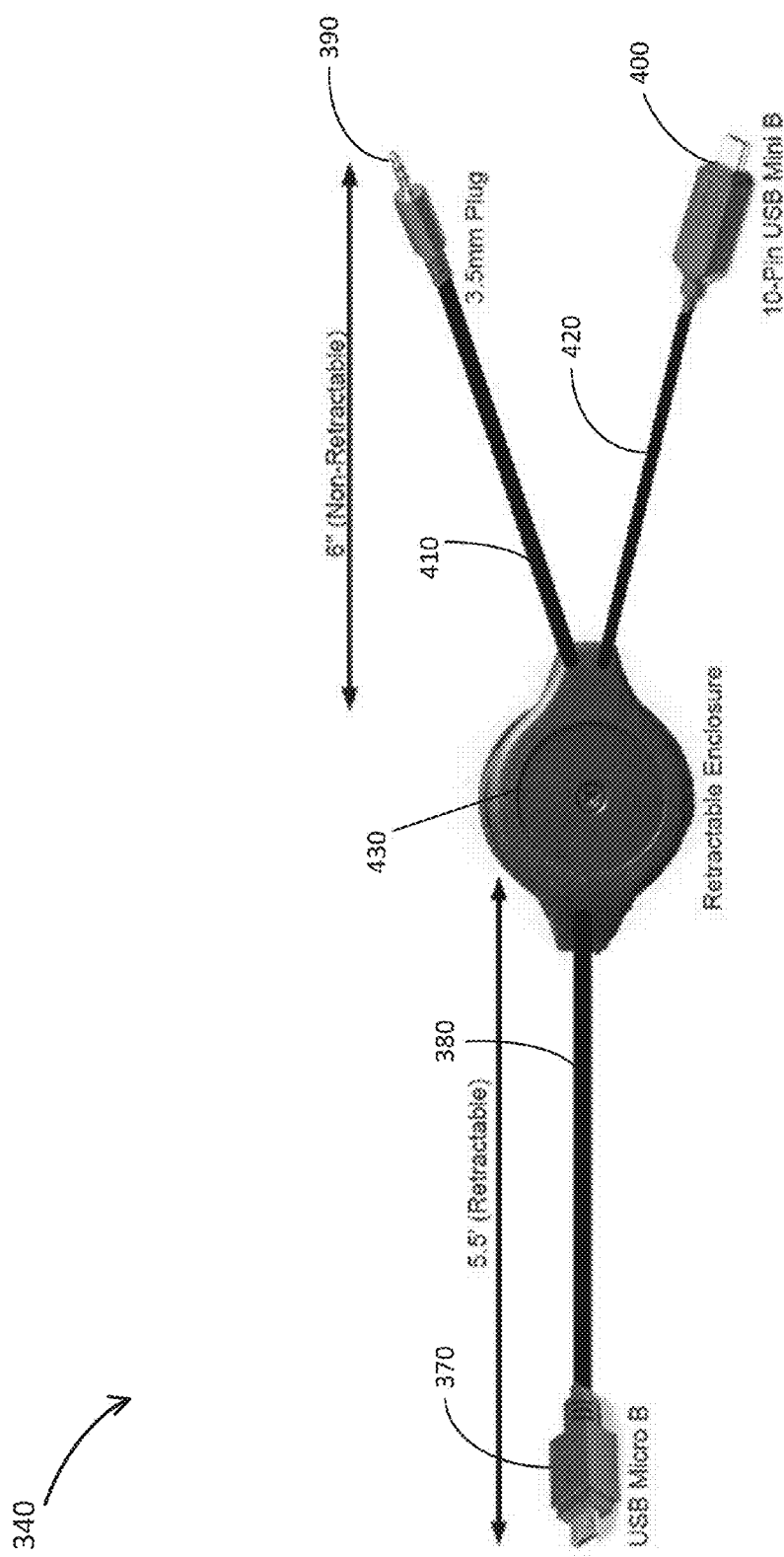
FIG. 19A shows a schematic illustration of how earpieces of the present disclosure may be configured to connect with one or more analog and/or digital audio devices via a cable of the present invention.

As shown in FIG. 19A, the audio cable 340 is configured to connect with the earpieces 110 of the present disclosure via a standard connection 370. In one embodiment, the connection 370 may be a USB Micro B connection, as shown in FIG. 19A. The connection 370 is coupled or attached to a length of cable 380. While the particular length of the cable 380 may be varied, in one embodiment of the present invention, the length is about 5.5 feet. At the opposite end of cable 340 is one or more connections to facilitate the connection of the earpieces 110 with one or more audio 350 and/or digital audio 360 devices. For example, cable 340 may be configured to terminate in a 3.5 mm plug 390, which is a typical audio connection for many analog audio devices 350. As another example, cable 340 may be configured to terminate in a 10-pin USB Mini B connection 400, which is a typical audio connection for many digital audio devices 360. As one non-limiting example, a GoPro videorecorder is a digital audio device that uses a 10-pin USB Mini B connection for audio input.

Figure 19B:
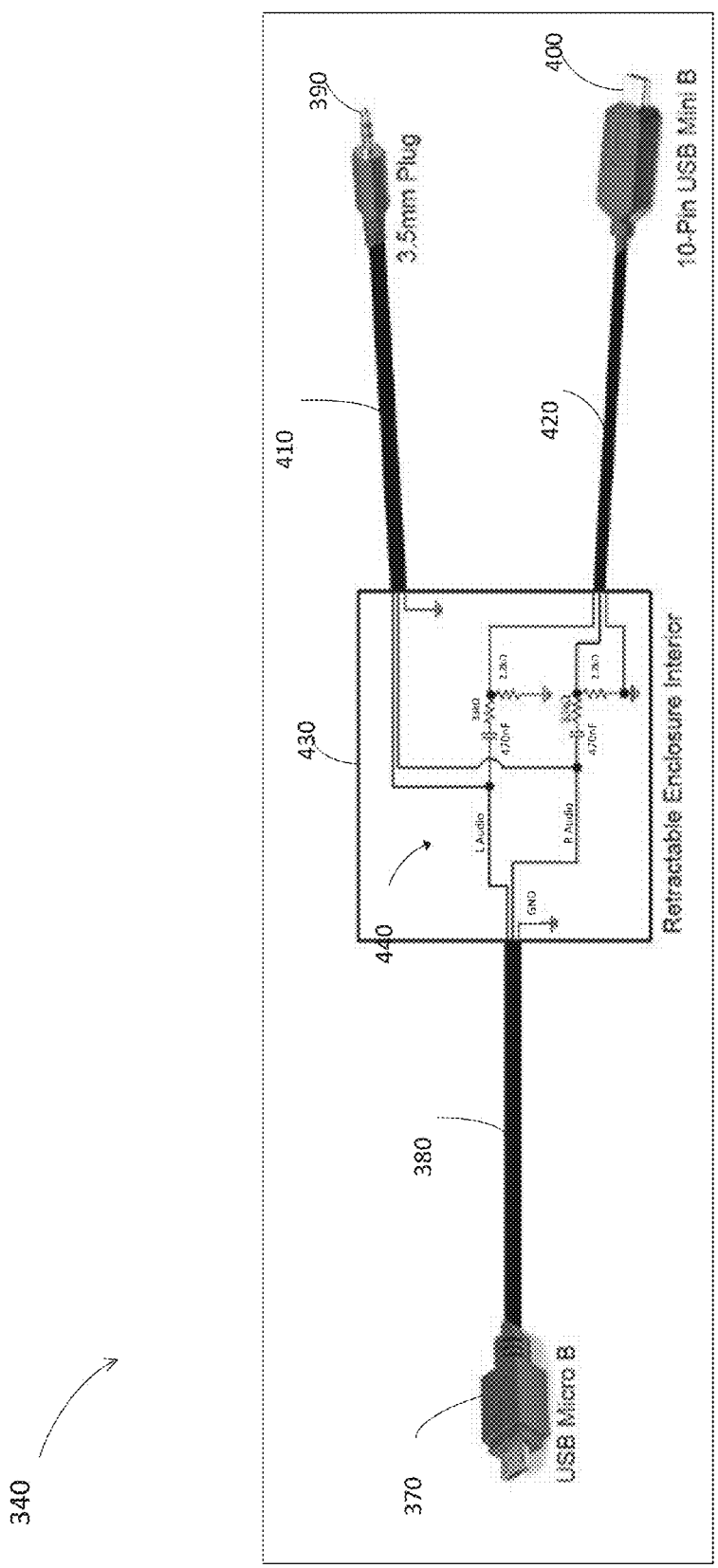
FIG. 19B shows another schematic illustration of how earpieces of the present disclosure may be configured to connect with one or more analog and/or digital audio devices via a cable of the present invention.

Connections 390 and 400 are coupled to a housing 430 via cables 410 and 420. As shown in FIG. 19B, housing 430 may be configured to include the necessary circuitry 440 to accommodate connections 390 and 400 and to provide for audio signals to pass from connections 390 and 400 to connection 370. Circuitry 440 connects the left and right audio channels received from connections 390 and 400 with the left and right audio inputs of connection 370, and the particular circuitry employed depends on the particular connections 370, 390, and 400. FIG. 19B shows one particular configuration in which connection 370 is a USB Micro B connection, connection 390 is a 3.5 mm analog audio plug, and connection 400 is a 10-pin USB Mini B connection. Housing 430 also may contain a cable retraction mechanism configured to retract and contain or control cable 380.

Wireless Binaural Recording

The binaural recording system 100 may be configured to connect wirelessly, using Bluetooth or other wireless protocols, to a smart phone device, such that binaural recording is transmitted wirelessly from the binaural recording system 100 to a user's smart phone device. Depending on the wireless transmission protocol used and the operating system of the user's smart phone device, one or more codec packs may be deployed.

Figure 20:
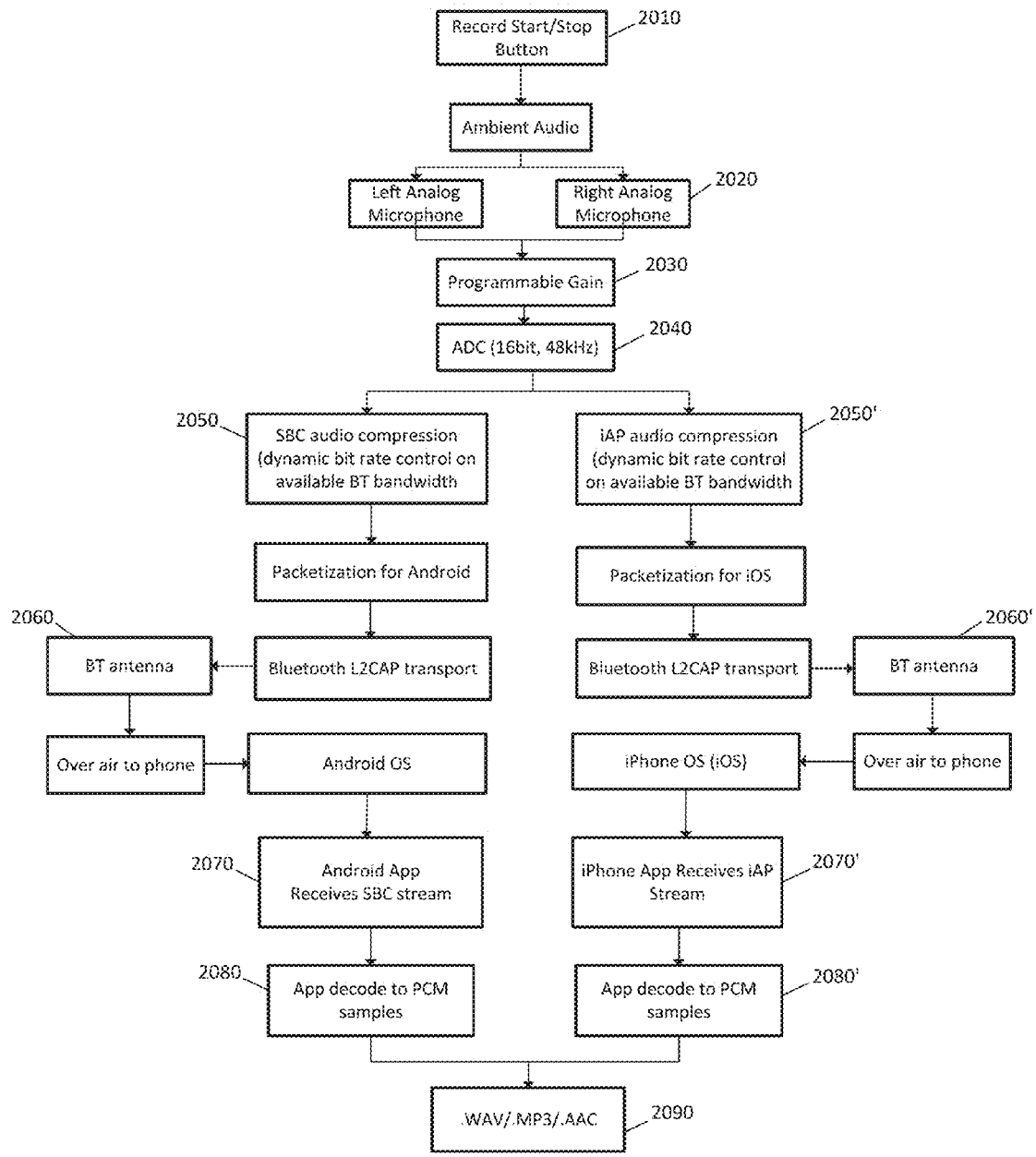
FIG. 20 shows a flow chart of the steps involved in the recording of binaural audio using earpieces of the present disclosure wirelessly, via a Bluetooth connection.

As shown in FIG. 20, in one non-limiting embodiment of the binaural recording system 100 of the present disclosure, binaural recording is transmitted wirelessly to a user's smart phone device using Bluetooth wireless transmission protocol. One or more Bluetooth codec packs may be included, such that the binaural recording signals are compatible with different smart phone operating systems. As shown in FIG. 20, in one non-limiting embodiment of the binaural recording system 100, codec packs configured for both AppleOS and Android smart phone operating systems are provided.

FIG. 20 outlines the general steps to facilitate wireless binaural recording over Bluetooth. Beginning with block 2010, a user may initiate binaural recording through a smart phone software application or app, as described above, by triggering the record start/stop button or icon, thereby causing the earpieces 110 to receive ambient sound and any impulsive source sound. In particular, at block 2020, the left and right microphones 130, which in one embodiment are analog omni-directional microphones, are placed strategically within the ear lobe, as described above, to act identify to an ear drum. Sound localization begins the moment that audio arrives at the microphones 130. Audio received by the microphones 130 may be adjusted via a user-programmable gain, at block 2030, which a user can control via the user's smart phone device. At this point, the analog audio is converted to digital signals, at block 2040, so that the signals can be passed along to the smart phone. In one embodiment, a 16-bit, 48 kHz analog-to-digital converter ("ADC") may be used.

At block 2050 of FIG. 20, the digitally-converted audio input is passed along to one or more codecs for processing so that the audio input is compatible with a user's smart phone device. Depending on the particular smart phone device and its operating system, such as AppleOS or Android operating systems, the digitally-converted audio input may be passed through different codecs, as represented by the fork in the flow chart at block 2050 of FIG. 20. As shown, block 2050 begins the codec processing as customized for a smart phone device having the Android operating system, while block 2050' is the same general processing except that it has been customized for a smart phone device having the AppleOS operating system. At block 2050 and 2050', the digitally-converted audio input is compressed to make it compatible with Bluetooth transmission protocols. The signals then are packetized for the appropriate operating system of the user's smart phone device. Next, at blocks 2060 and 2060', the signals are transmitted wirelessly using Bluetooth transmission protocol and received by the user's smart phone device.

Once a user's smart phone device has received the audio input via wireless Bluetooth transmission, at blocks 2070 and 2070', a software application residing on the user's smart phone device may be configured to stream the audio signals in real-time. The smart phone software application may be further configured to decode the audio signals. In one embodiment of the present disclosure, decoding is limited to a small percentage of the audio feed to minimize latency and quality loss in the audio stream, thereby maximizing the ability to receive the audio stream in real-time. At blocks 2080 and 2080', the audio stream may be fully decoded once the user has stopped the binaural recording. In one embodiment of the present disclosure, the signal decoding may be a pulse-code modulation ("PCM") sample, which is a typical signal processing used with digital audio signals.

The user's smart phone device may be configured to convert the audio stream into a musical or audio file for storage, as shown at block 2090 of FIG. 20. Typical audio files include wave (.wav) files, MPEG-1 and/or MPEG-2 Layer III (.mps) files, and MPEG-2 Advanced Audio Coding (.acc) files. The particular file types selected by a user may be based on user preference or capabilities of the user's smart phone device and the software applications selected by the user.

Figure 21:
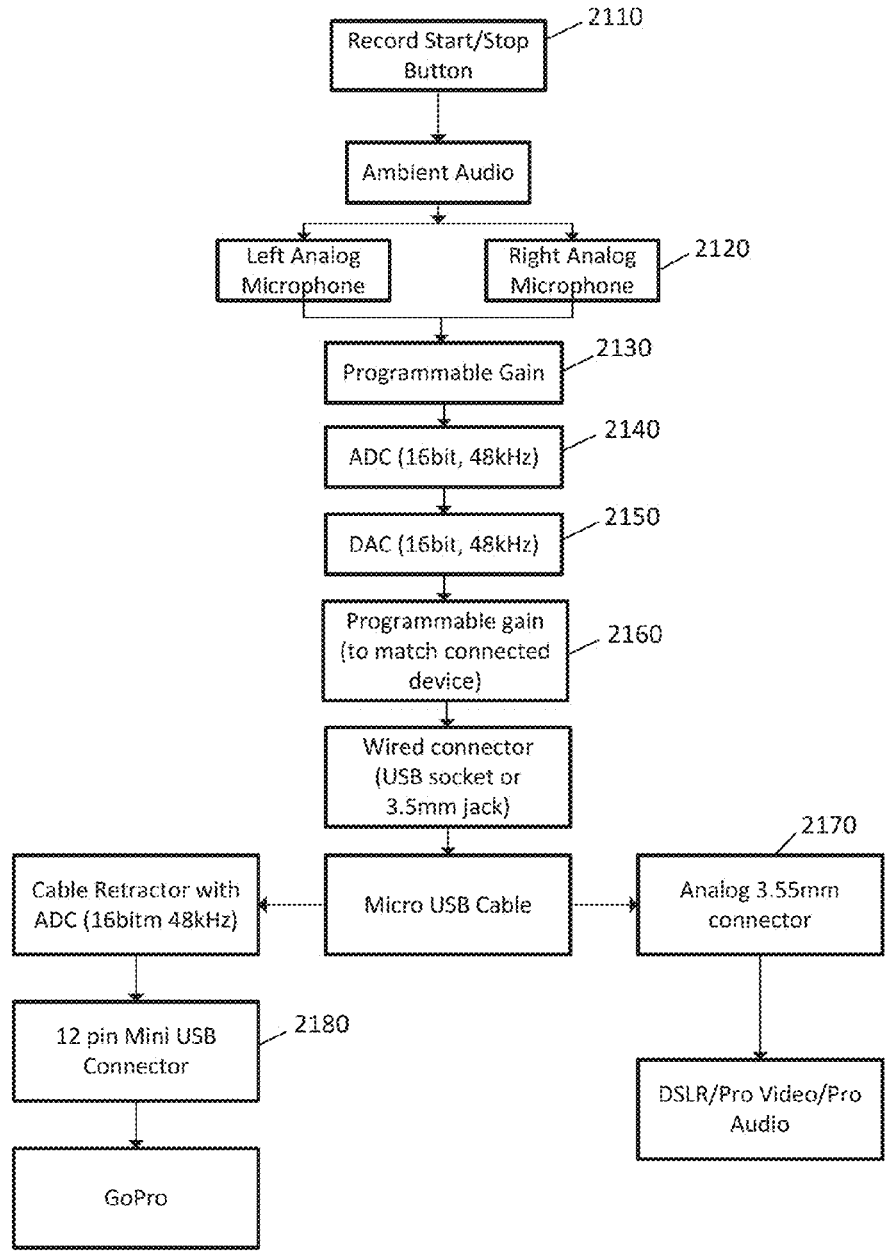
FIG. 21 shows a flow chart of the steps involved in the recording of binaural audio using earpieces of the present disclosure via a wired connection.

The binaural recording system 100 may be configured to connect via a wired connection to one or more analog and/or digital audio devices, such that binaural recording is transmitted via cable from the binaural recording system 100 to the audio devices. As shown in FIG. 21, in one non-limiting embodiment of the binaural recording system 100 of the present disclosure, binaural recording is transmitted via cable or wire from the binaural recording system 100 to one or more audio devices, which may be facilitated by using cable 340 described above. The general steps to facilitate recording via cable are similar to what is shown in FIG. 20 and described above up until the point where the Bluetooth codec begins at block 2050. As a wired connection would not need a Bluetooth codec, the Bluetooth codec functionality may be omitted from the recording process in a wired environment.

Similar to block 2010 in FIG. 20, binaural recording in a wired environment is initiated by a user via a smart phone software application, as shown by block 2110. Once recording is initiated, the left and right earpiece microphones 130 receive ambient and/or impulsive source sound, as shown at block 2120. In one embodiment of the present disclosure, the microphones 130 are analog omni-directional microphones. At block 2130, the audio signals may be passed through a user-programmable gain, which a user may customize using software applications on the user's smart phone device.

Because a wired connection would not utilize any wireless Bluetooth transmission, an analog-to-digital conversion of the audio signals is not necessary. Accordingly, block 2140 in FIG. 21 may or may not be included. With a binaural recording system 100 configured for both wireless and wired transmission, it may be desirable to include the analog-to-digital converter ("ADC"), shown at blocks 2040 and 2140, to maximize manufacturing efficiencies. For instance, including the converter would allow for the same programmable circuit board (PCB) to be used in either instance. When a user directs the transmission of audio signals through a wired connection, the audio signals would bypass the analog-to-digital converter. At step 2150 of FIG. 21, digital-to-analog conversion ("DAC") may take place, for audio that is passed via a 3.5 mm analog audio plug. At step 2160, a user may be able to adjust the gain a second time, to the extent that any audio device connected to the binaural recording system 100 includes a separate gain switch, filter or selection knob.

As shown at blocks 2170 and 2180 of FIG. 21, the binaural recording audio signals pass via cable to one or more audio devices. In the instance of cable 340 described above, the audio input may be passed to one or more analog audio 350 or digital audio 360 devices. For example, at block 2170, the audio input may be passed via a 3.5 mm analog audio plug 390 to an analog device 350. As another example, as shown at block 2180, the audio input may be passed via a 12-pin Mini USB connection 400 to a digital audio device 360.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A binaural recording system for recording a sound from an impulsive source comprising:
  a right earpiece, the right earpiece including:
    a right frame, the right frame adapted to be worn on a right ear, the right frame defining a right ear-insertion end and a right posterior end opposite the right ear-insertion end, the right ear-insertion end adapted to be positioned within a right ear canal,
    a right microphone, the right microphone coupled to the right frame and the right microphone adapted to be positioned outside the right ear canal and substantially coplanar with a right tragus of the right ear, wherein the right microphone captures a right side frequency from the impulsive sound source, and
    a right transducer, the right transducer coupled to the right ear-insertion end of the right frame, and the right transducer configured to reproduce a right sound;
  a left earpiece, the left earpiece including:
    a left frame, the left frame adapted to be worn on a left ear, the left frame defining a left ear-insertion end and a left posterior end opposite the left ear-insertion end, the left ear-insertion end adapted to be positioned within a left ear canal,
    a left microphone, the left microphone coupled to the left frame and the left microphone adapted to be positioned outside the left ear canal and substantially coplanar with a left tragus of the left ear, wherein the left microphone captures a left side frequency from the impulsive sound source, and
    a left transducer, the left transducer coupled to the left ear-insertion end of the left frame, and the left transducer configured to reproduce a left sound;
  a non-transitory device operatively coupled to the right earpiece and the left earpiece and having instructions thereon that are configured when executed to determine a source localization of the sound from the impulsive source responsive to the right side frequency and the left side frequency, the source localization including an azimuth component and an elevation component,
  wherein the azimuth component and the elevation component are representative of a three-dimensional impression of the sound, and
  wherein both the right transducer produces the right sound and left transducer reproduces the left sound responsive to the source localization;
a wireless transmitter, the wireless transmitter coupled to at least one of the right earpiece and the left earpiece, the wireless transmitter configured to transmit data representative of the source localization and the sound from the impulsive source and receive incoming data representative of the right sound and the left sound; and
a power supply, the power supply coupled to at least one of the right earpiece and the left earpiece and the power supply coupled to the right microphone, the left microphone, the right transducer, left transducer, and the wireless transmitter.

2. The binaural recording system of claim 1, wherein the non-transitory device is further configured to:
  receive data captured by the right earpiece in the form of a right side head-related impulse response;
  receive data captured by the left earpiece in the form of a left side head-related impulse response;
  process the right side head-related impulse response using a Fourier transformation to generate a right side Head-Related Transfer Function, the right side Head-Related Transfer Function including all characteristic of the impulsive sound source captured by the right earpiece; and
  process the left side head-related impulse response using a Fourier transformation to generate a left side Head-Related Transfer Function, the left side Head-Related Transfer Function including all characteristic of the impulsive sound source captured by the left earpiece.

3. The binaural recording system of claim 2, wherein the non-transitory device is further configured to:
  determining the source localization of the impulsive source of the sound from the impulsive source, which provides for accurate synthesis of binaural sound from the impulsive source.

4. The binaural recording system of claim 2, wherein the right side head-related impulse response comprises a right side sound pressure level, a right side azimuth component and a right side elevation component and the left side head-related impulse response comprises a left side sound pressure level, a left side azimuth component and a left side elevation component;
  determining a frequency domain, the frequency domain including a relative arrival time and strength for each of the right side head-related impulse response and the left side head-related impulse response; and
  synthesizing the sound, wherein synthesizing the sound includes compiling the right side head-related impulse response, the left side head-related impulse response, and the frequency domain.

5. The binaural recording system of claim 1, wherein the right microphone captures a right side frequency from an ambient sound source and the left microphone captures a left side frequency from the ambient sound source, wherein the three-dimensional impression of sound includes the impulsive sound source and the ambient sound source.

6. The binaural recording system of claim 1, wherein the left and right microphones are positioned such that the outgoing data represents frequency response characteristics substantially without augmentation or attenuation relative to frequency characteristics of the impulsive sound source from approximately 20 Hz to approximately 20 kHz.

7. The binaural recording system of claim 1, comprising a camera operatively coupled to the non-transitory device, wherein the non-transitory device further has instructions stored thereon that are configured when executed to record a video signal.

8. The binaural recording system of claim 1, wherein the non-transitory device further has instructions stored thereon that are configured when executed to determine a command selected from a group comprising: recording only the impulsive sound source, recording an ambient sound source, and recording both the impulsive sound source and the ambient sound source.

9. The binaural recording system of claim 1, wherein the non-transitory device further has instructions stored thereon that are configured when executed to:
  prompt a user, via a processor, to select a recording option on a touchscreen of a recorder, the recording option selected from a group comprising recording audio, recording audio and video, broadcasting audio, and broadcasting audio and video;
  receive at least one gesture from the user on the touchscreen;
  determine, via the processor, the selected recording option; and
  create, via the processor, at least one binaural recording using the binaural recording system described in claim 1, wherein outgoing data is representative of the sound and the selected recording option.

10. The binaural recording system of claim 1, wherein the non-transitory device determines the source localization of the sound as soon as the impulsive sound source reaches the right earpiece or the left earpiece.

11. The binaural recording system of claim 1, wherein the non-transitory device is configured to determine a user-programmable gain, the user-programmable gain determined by a process with instruction to:
  display a left mic level on a display of a device, the left mic level including a left side recording level and a left side sound level, the left side sound level including a left side sound of the impulsive source as captured by the left microphone, and the left side recording level including a user-adjustable level of recording, wherein the left side recording level being close to the left side sound level results in an enhanced and louder left side sound;
  display a right mic level on a display of a device, the right mic level including a right side recording level and a right side sound level, the right side sound level including a right side sound of the impulsive source as captured by the right microphone, and the right side recording level including a user-adjustable level of recording, wherein the right side recording level being close to the right side sound level results in an enhanced and louder right side sound;
  capture the left side recording level;
  capture the right side recoding level;
  adjust the recording of the left sound level in response to the left side recording level; and
  adjust the recording of the right sound level in response to the right side recording level.

12. The binaural recording system of claim 1, wherein the right microphone captures the right side frequency from the impulsive sound source in analog and the left microphone captures the left side frequency from the impulsive sound source in analog, and wherein the non-transitory device is further configured to convert the analog into a digital signal.

13. The binaural recording system of claim 1, wherein the non-transitory device is further configured to:
compress the digitally-converted sound to make it compatible with a Bluetooth transmission protocol; and
transmit the digitally-converted sound wirelessly using Bluetooth transmission protocol to a smart phone device.

* * * * *